(12) United States Patent
McPhillips

(10) Patent No.: US 9,788,668 B2
(45) Date of Patent: Oct. 17, 2017

(54) DISPLAY SYSTEM

(71) Applicant: Atomic Design Inc., Lititz, PA (US)

(72) Inventor: Thomas McPhillips, Manheim, PA (US)

(73) Assignee: Atomic Design Inc., Lititz, PA (US)

( * ) Notice: Subject to any disclaimer, the term of this patent is extended or adjusted under 35 U.S.C. 154(b) by 122 days.

(21) Appl. No.: 14/744,929

(22) Filed: Jun. 19, 2015

(65) Prior Publication Data

US 2016/0367050 A1  Dec. 22, 2016

(51) Int. Cl.

| A47F 5/10 | (2006.01) |
|---|---|
| A47F 5/08 | (2006.01) |
| A47F 3/00 | (2006.01) |
| E04H 1/12 | (2006.01) |
| F16M 13/00 | (2006.01) |

(Continued)

(52) U.S. Cl.
CPC ............... *A47F 5/10* (2013.01); *A47F 3/00* (2013.01); *A47F 5/0807* (2013.01); *A63J 1/02* (2013.01); *E04H 1/1272* (2013.01); *F16M 13/00* (2013.01); *G09F 9/00* (2013.01); *G09F 15/0068* (2013.01); *E04H 3/24* (2013.01); *F16B 12/52* (2013.01)

(58) Field of Classification Search
CPC .. A47F 5/10; A47F 5/0807; A47F 3/00; A63J 1/00; E04H 1/1271; E04H 3/24; G03B 21/58; G09F 9/00
See application file for complete search history.

(56) References Cited

U.S. PATENT DOCUMENTS 1,525,515 A    2/1925  Socha
2,611,460 A *  9/1952  Nash ................... A47B 47/025
                                                       211/135

(Continued)

FOREIGN PATENT DOCUMENTS

AU    2012261483 A1   6/2013
CA    1263233 A1     11/1989

(Continued)

OTHER PUBLICATIONS

Installation Instructions for Pillow Wall, by Atomic, www.atomicrental.tv, (717-626-4408), dated Nov. 25, 2013, 1 page.

(Continued)

*Primary Examiner* — Stanton L Krycinski
(74) *Attorney, Agent, or Firm* — Barley Snyder

(57) ABSTRACT

A display system is provided and include base panel, a collapsible structure, a structure connector, and a base connector. The collapsible structure includes a pair of modular display panels with a pair of panel connectors that receive one another. The structure connector includes a pair of planar body sections angled with respect to each and connects to the pair of modular display panels. The base connector connects the collapsible structure to the base panel and includes a first planar body section secured to the collapsible structure, a second planar body section positioned adjacent to the first planar body section and secured to the collapsible structure, and a third planar body section positioned adjacent to the first planar body section and the second planar body section and secured to the base panel.

16 Claims, 17 Drawing Sheets

(51) Int. Cl.
  *G09F 9/00* (2006.01)
  *A63J 1/02* (2006.01)
  *G09F 15/00* (2006.01)
  *E04H 3/24* (2006.01)
  *F16B 12/52* (2006.01)

(56) References Cited

U.S. PATENT DOCUMENTS

| | | | | |
|---|---|---|---|---|
| 2,626,059 A | * | 1/1953 | Turner | A47F 5/10 |
| | | | | 211/189 |
| 2,692,689 A | | 10/1954 | Wynne, Sr. | |
| 2,921,347 A | * | 1/1960 | Solomon | A47F 5/10 |
| | | | | 16/108 |
| 2,970,396 A | | 2/1961 | Worrell | |
| 3,069,216 A | * | 12/1962 | Vaeth | A47B 47/042 |
| | | | | 108/158.12 |
| 3,192,820 A | | 7/1965 | Pitzer | |
| 3,426,913 A | | 2/1969 | Abatiell, Jr. | |
| 3,537,199 A | | 11/1970 | Lawson | |
| 3,571,999 A | | 3/1971 | Downing | |
| 3,593,474 A | | 7/1971 | Neels | |
| 3,596,701 A | | 8/1971 | Cowan | |
| 3,766,864 A | * | 10/1973 | Baker | A47F 5/112 |
| | | | | 108/158.12 |
| 3,931,894 A | * | 1/1976 | Murphy | A47F 5/04 |
| | | | | 211/163 |
| 3,936,111 A | | 2/1976 | Mazzucconi | |
| 4,001,987 A | | 1/1977 | Coulthard | |
| 4,023,681 A | * | 5/1977 | Plant | A47B 73/00 |
| | | | | 211/74 |
| 4,114,160 A | | 9/1978 | Verini | |
| 4,118,903 A | * | 10/1978 | Coulthard | A47B 57/26 |
| | | | | 108/152 |
| 4,257,207 A | * | 3/1981 | Davis | A47B 96/205 |
| | | | | 446/109 |
| 4,365,454 A | * | 12/1982 | Davis | A47B 96/205 |
| | | | | 446/109 |
| 4,516,619 A | * | 5/1985 | Hasbrouck | E04B 2/7425 |
| | | | | 160/135 |
| 4,577,856 A | * | 3/1986 | Blackaby | A63J 1/00 |
| | | | | 52/6 |
| 4,582,002 A | * | 4/1986 | Wright | A47B 47/042 |
| | | | | 108/60 |
| 4,597,231 A | * | 7/1986 | Quest | E04B 2/7425 |
| | | | | 52/239 |
| 4,610,560 A | * | 9/1986 | Miller | A47F 5/105 |
| | | | | 16/366 |
| 4,712,336 A | * | 12/1987 | Backer | E04B 1/34384 |
| | | | | 160/351 |
| 4,761,922 A | * | 8/1988 | Black | E04B 2/74 |
| | | | | 160/135 |
| 4,774,792 A | * | 10/1988 | Ballance | E04B 2/7431 |
| | | | | 160/135 |
| 4,807,837 A | | 2/1989 | Gawlik et al. | |
| 4,856,928 A | * | 8/1989 | Savale | E04H 1/1272 |
| | | | | 403/174 |
| D307,448 S | | 4/1990 | Akard | |
| D317,991 S | * | 7/1991 | Wightman | D6/683.1 |
| 5,036,641 A | | 8/1991 | Viry | |
| 5,061,018 A | | 10/1991 | Pederson et al. | |
| 5,302,039 A | * | 4/1994 | Omholt | E04B 2/7401 |
| | | | | 24/135 R |
| 5,344,115 A | | 9/1994 | Mayne et al. | |
| 5,478,041 A | | 12/1995 | Mayne | |
| 5,590,921 A | | 1/1997 | Holtman et al. | |
| 5,671,852 A | | 9/1997 | Maharg | |
| 5,680,737 A | * | 10/1997 | Sheipline | E04B 1/24 |
| | | | | 403/169 |
| 5,722,477 A | | 3/1998 | Richter et al. | |
| 5,947,356 A | | 9/1999 | Delong | |
| 5,993,287 A | | 11/1999 | Melashenko et al. | |
| 6,340,046 B1 | | 1/2002 | Basseches | |
| 6,370,803 B1 | | 4/2002 | Burquest | |
| 6,415,567 B1 | * | 7/2002 | Mead | E04B 2/7422 |
| | | | | 160/135 |
| 6,419,332 B1 | | 7/2002 | Caldwell, Jr. et al. | |
| 6,532,878 B2 | * | 3/2003 | Tidemann | A47B 47/042 |
| | | | | 108/158.12 |
| 6,595,378 B2 | * | 7/2003 | Wang | A47B 47/0075 |
| | | | | 211/186 |
| 6,615,999 B1 | * | 9/2003 | Culp | A47B 47/042 |
| | | | | 211/184 |
| 6,702,640 B1 | | 3/2004 | Park | |
| 6,718,709 B2 | | 4/2004 | Koutras et al. | |
| 6,845,871 B1 | * | 1/2005 | Culp | A47B 47/042 |
| | | | | 211/184 |
| 6,983,853 B1 | | 1/2006 | Fickett | |
| D515,252 S | * | 2/2006 | Dumbrell | D30/155 |
| 7,114,300 B1 | * | 10/2006 | Culp | A47B 47/042 |
| | | | | 211/184 |
| 7,234,604 B2 | * | 6/2007 | Eisele | A47B 57/42 |
| | | | | 108/65 |
| D562,113 S | * | 2/2008 | Ciungan | D14/452 |
| D618,282 S | | 6/2010 | Kosir | |
| D624,461 S | * | 9/2010 | Noble | D12/159 |
| 7,856,772 B1 | * | 12/2010 | Culp | A47B 47/042 |
| | | | | 211/186 |
| 7,874,090 B2 | | 1/2011 | Flagg | |
| D634,745 S | | 3/2011 | Park et al. | |
| 8,069,632 B2 | | 12/2011 | Li | |
| 8,083,189 B2 | | 12/2011 | Sun et al. | |
| 8,662,326 B2 | * | 3/2014 | Brick | A47B 47/042 |
| | | | | 211/186 |
| D708,504 S | | 7/2014 | Kaplan | |
| D709,203 S | | 7/2014 | Shikata | |
| 8,807,356 B2 | * | 8/2014 | Weigand | A47F 5/10 |
| | | | | 211/183 |
| 8,832,917 B1 | * | 9/2014 | Elliott | B23P 17/00 |
| | | | | 29/428 |
| D723,624 S | | 3/2015 | McPhillips | |
| D736,858 S | | 8/2015 | McPhillips | |
| 9,254,051 B2 | * | 2/2016 | McPhillips | G09F 15/00 |
| 2001/0037987 A1 | * | 11/2001 | Culp | A47B 47/042 |
| | | | | 211/186 |
| 2002/0036908 A1 | | 3/2002 | Pederson | |
| 2002/0154789 A1 | | 10/2002 | Rodgers | |
| 2003/0000904 A1 | | 1/2003 | Lung et al. | |
| 2003/0010738 A1 | * | 1/2003 | Hsia | A47B 47/042 |
| | | | | 211/188 |
| 2003/0192271 A1 | | 10/2003 | Koutras et al. | |
| 2004/0035987 A1 | | 2/2004 | Oddsen, Jr. | |
| 2004/0089782 A1 | | 5/2004 | Eliason et al. | |
| 2005/0007031 A1 | | 1/2005 | Hyder | |
| 2007/0107853 A1 | | 5/2007 | Hsieh | |
| 2008/0308508 A1 | * | 12/2008 | Fischer | A47B 73/00 |
| | | | | 211/2 |
| 2009/0134285 A1 | | 5/2009 | Huang | |
| 2009/0196034 A1 | | 8/2009 | Gherardini et al. | |
| 2009/0309464 A1 | * | 12/2009 | Schwartz | A47B 47/0033 |
| | | | | 312/111 |
| 2010/0093257 A1 | * | 4/2010 | Elliott | A47B 3/06 |
| | | | | 446/478 |
| 2012/0169999 A1 | | 7/2012 | Cavendish et al. | |
| 2014/0047747 A1 | | 2/2014 | Jackson | |
| 2014/0183309 A1 | | 7/2014 | Pasho | |
| 2014/0197123 A1 | | 7/2014 | McPhillips | |
| 2014/0197124 A1 | | 7/2014 | McPhillips | |

FOREIGN PATENT DOCUMENTS

| | | | | |
|---|---|---|---|---|
| DE | 2921599 A1 | * | 12/1980 | A47F 3/12 |
| DE | 3225639 A1 | * | 1/1984 | A47F 5/0018 |
| DE | 8517546.3 U1 | | 1/1985 | |
| DE | 3712214 A1 | * | 10/1987 | E04B 1/19 |
| DE | 9114149 U1 | * | 1/1992 | A47F 5/105 |
| DE | 29820223 U1 | | 2/1999 | |
| DE | 10138986 A | | 3/2003 | |
| DE | 102011015351 A1 | | 10/2012 | |
| DK | EP 0841029 A2 | * | 5/1998 | A47F 5/10 |
| EP | 0141699 A2 | * | 5/1985 | E04B 2/825 |

(56) References Cited

FOREIGN PATENT DOCUMENTS

| EP | 0376783 | A1 | * | 7/1990 | ........... A47F 5/0807 |
|---|---|---|---|---|---|
| EP | 1995508 | A2 | | 11/2008 | |
| FR | 2851442 | A1 | | 2/2003 | |
| GB | 2276399 | A | | 9/1994 | |

OTHER PUBLICATIONS

PCT Notification, International Search Report and Written Opinion, International Application No. PCT/US2014/011055, dated Jun. 2, 2014, 10 pages.
PCT Notification, International Search Report, International Application No. PCT/US2014/061074, dated Feb. 25, 2015, 12 pages.
PCT Notification and International Preliminary Report on Patentability, Application No. PCT/US2014/011055, dated Jul. 14, 2015, 7 pages.
Installation Instructions for Pillow Wall, by Atomic, (877-626-8301), 1 page.
PCT Notification, International Search Report and Written Opinion of the International Search Authority, Intl. App. No. PCT/US2015/031782, dated Aug. 14, 2015, 11 pages.
PCT Search Report and the Written Opinion, dated Oct. 4, 2016, 13 pages.
PCT Notification and International Preliminary Report on Patentability, dated Apr. 19, 2016, 8 pages.

* cited by examiner

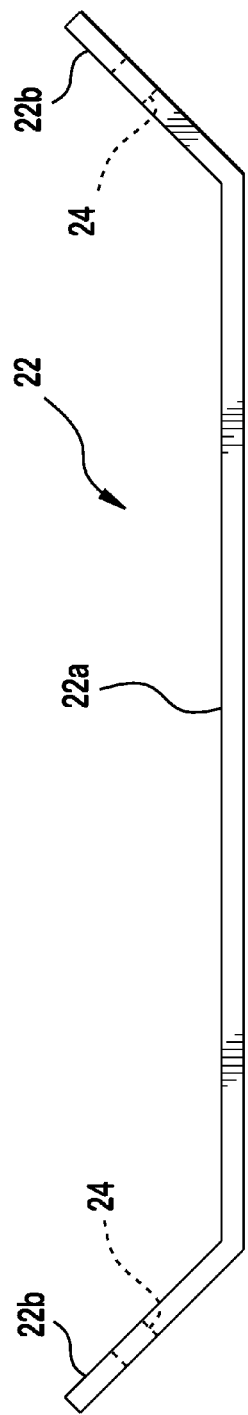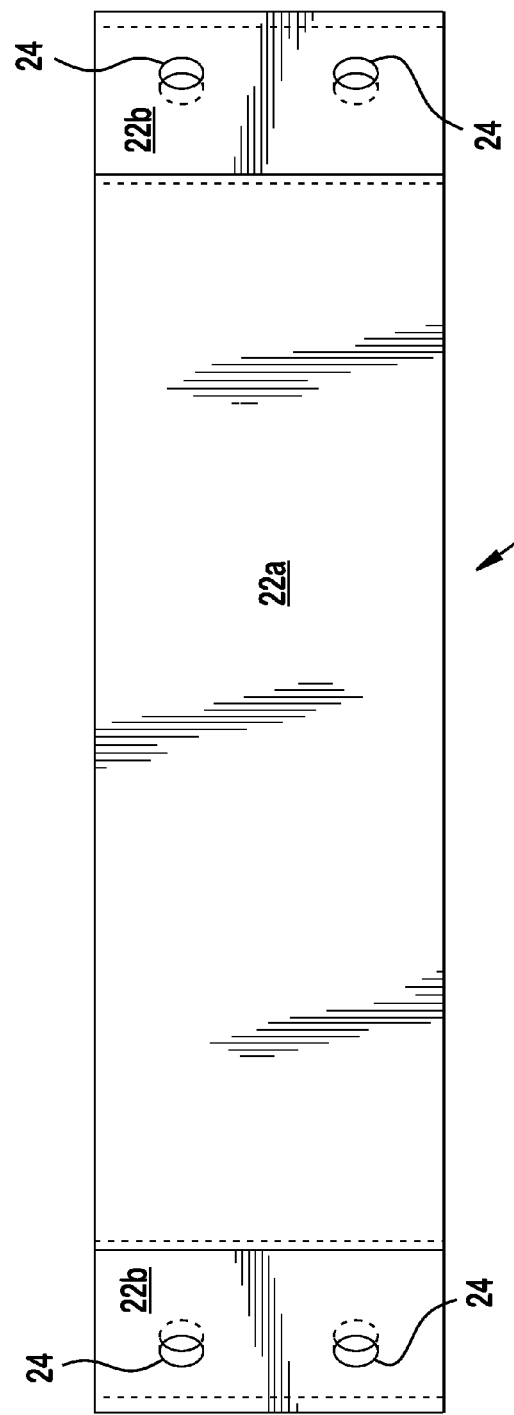
FIG. 6
FIG. 5

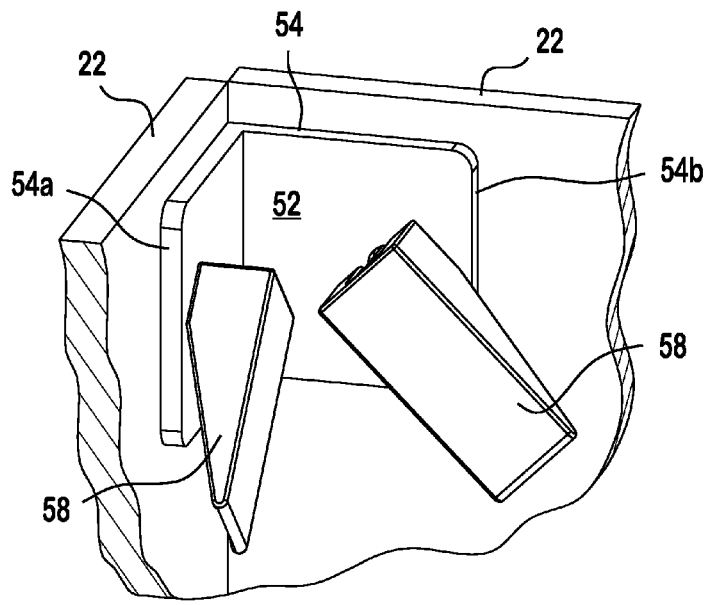
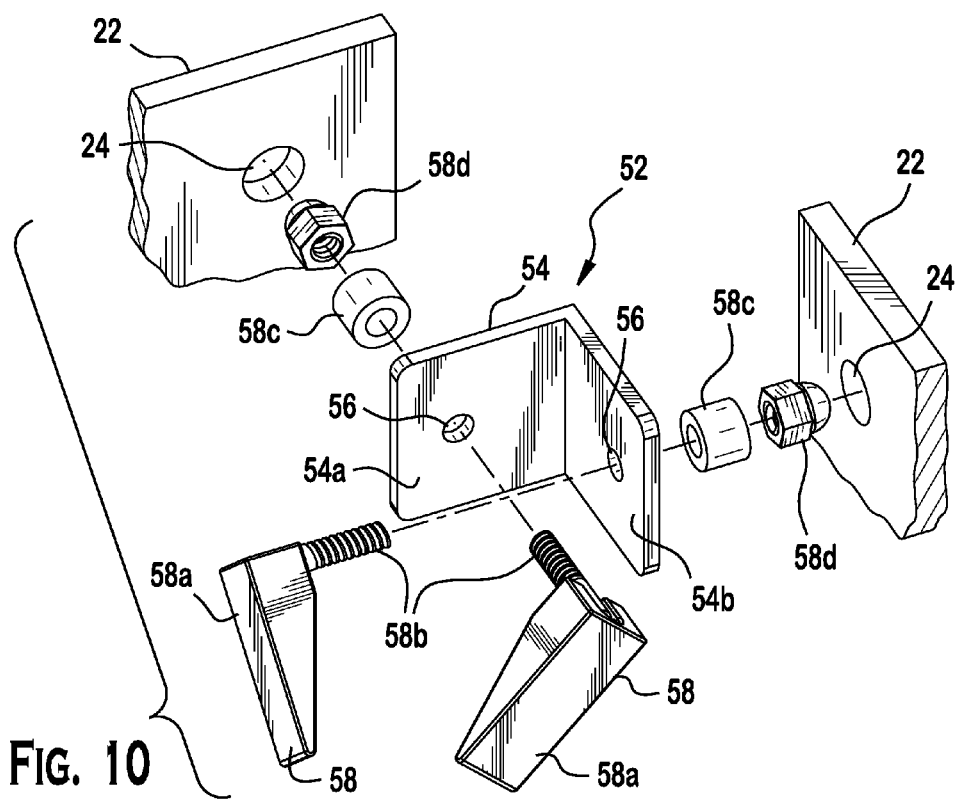

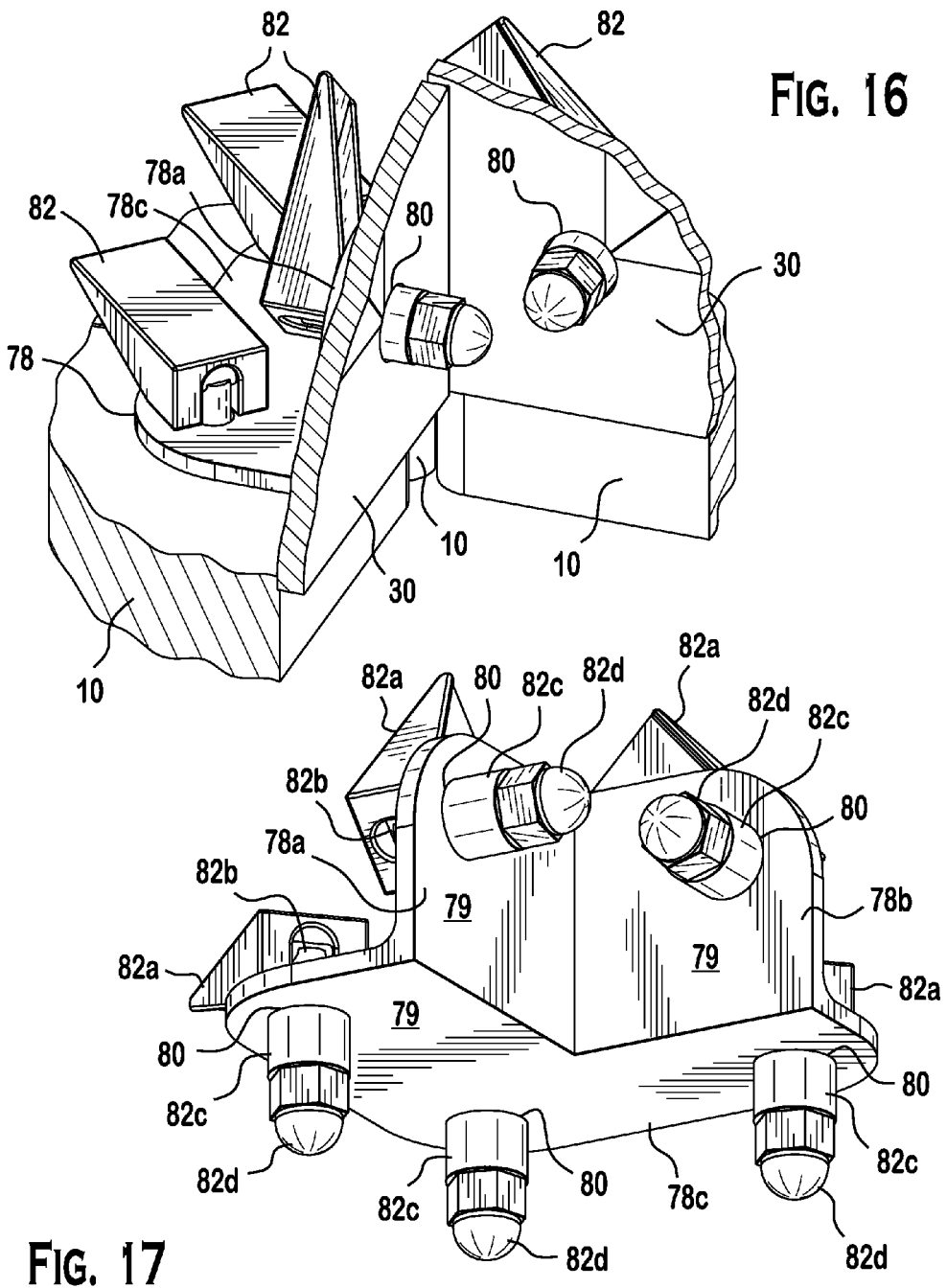

DISPLAY SYSTEM

FIELD OF THE INVENTION

The invention relates to a display system and, more particularly, to a portable display system for connecting a plurality of modular units.

BACKGROUND

Decorative modular displays are commonly used in stage and set design. Generally, modular units are hung from a hanging frame using backdrop technology. A known modular display system uses a truss or theatre fly-system pipes to hang modular panels that clip together using rings or hooks to form a backdrop, which results in a decorative surface that is aesthetic while also increasing the range of available lighting effects. The backdrop is sized to fit the space where it is installed. In some circumstances, a floor system may be used instead of a truss and/or backdrop. In the known floor display system, a temporary structure is erected from the floor, rather than suspended from the ceiling. The known floor display system includes metal pipes or tubes that connect to each other and the modular units hang from these metal pipes or tubes. When using pipes in the known display system, connecting pipes are commonly over tightened and damaged, and the modular units attached to the pipes are restricted from free movement about the pipe.

Furthermore, these known display systems include complex attachment mechanisms to connect one modular unit to an adjacent modular unit. These known designs are expensive and require tedious labor during assembly. Additionally, connection between adjacent modular units and controlling a gap between connecting adjacent modular units are problematic. Furthermore, each modular unit in the known display system is either permanently attached an the adjacent modular unit or requires a complex rigid connection system, which restricts replacement of each modular unit and/or the entire system. It has been long desired to have a modular display system having a seamless backdrop that is more customizable and stable.

SUMMARY

A display system is provided and include base panel, a collapsible structure, a structure connector, and a base connector. The collapsible structure includes a pair of modular display panels with a pair of panel connectors that receive one another. The structure connector includes a pair of planar body sections angled with respect to each and connects to the pair of modular display panels. The base connector connects the collapsible structure to the base panel and includes a first planar body section secured to the collapsible structure, a second planar body section positioned adjacent to the first planar body section and secured to the collapsible structure, and a third planar body section positioned adjacent to the first planar body section and the second planar body section and secured to the base panel.

BRIEF DESCRIPTION OF THE DRAWINGS

The invention will be explained in greater detail with reference to embodiments, referring to the appended drawings, in which:

FIG. 5 is front view of a base connector panel of the display system according to the invention;

FIG. 6 is top view of the base connector panel of FIG. 5;

FIG. 9 is a perspective view of a panel connector of the display system according to the invention;

FIG. 10 is an exploded perspective view of the panel connector of FIG. 9;

FIG. 16 is a perspective view of a support base connector of the display system according to the invention;

FIG. 17 is a bottom perspective view of the support base connector of FIG. 16;

DETAILED DESCRIPTION OF THE EMBODIMENT(S)

Embodiments of the invention will now be described in greater detail with reference to the drawings.

Figure 1:
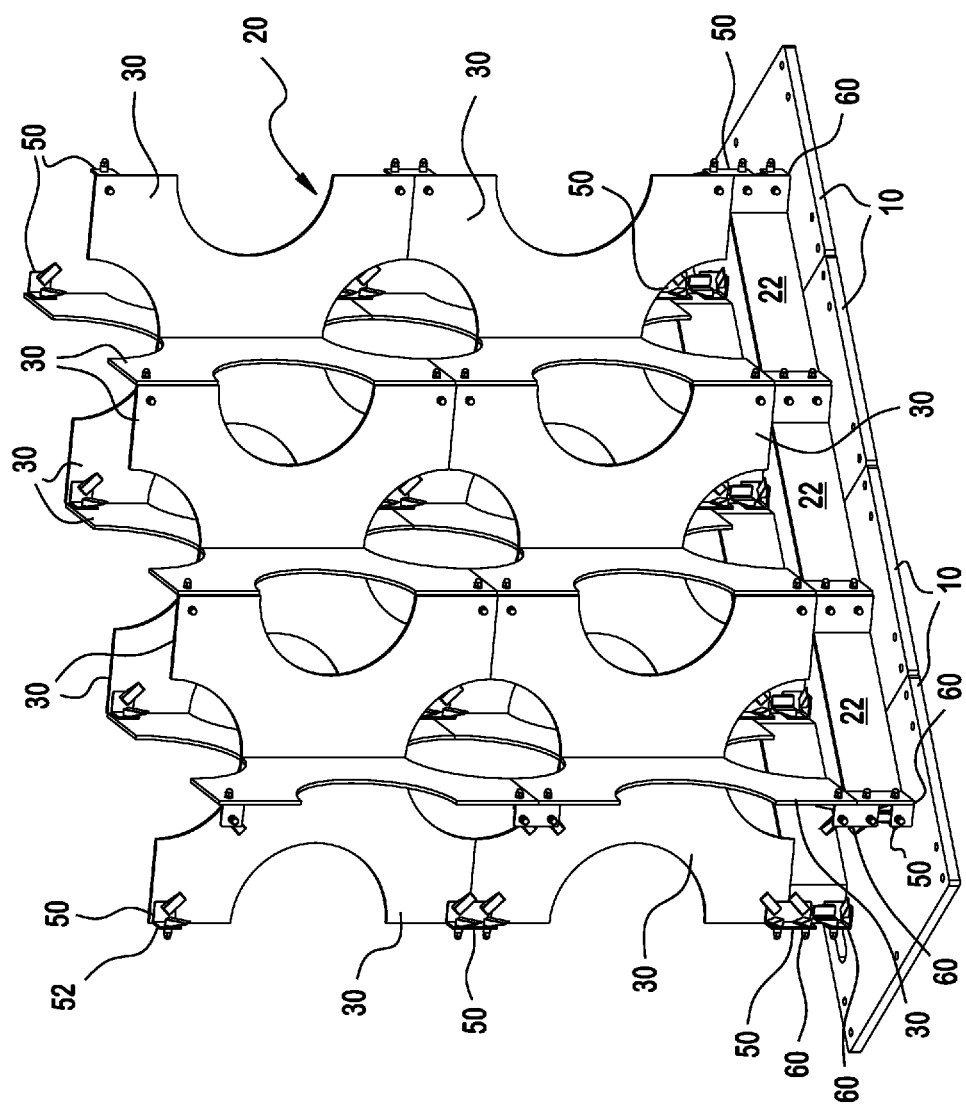
FIG. 1 is a perspective view of a display system according to the invention.
Figure 2:
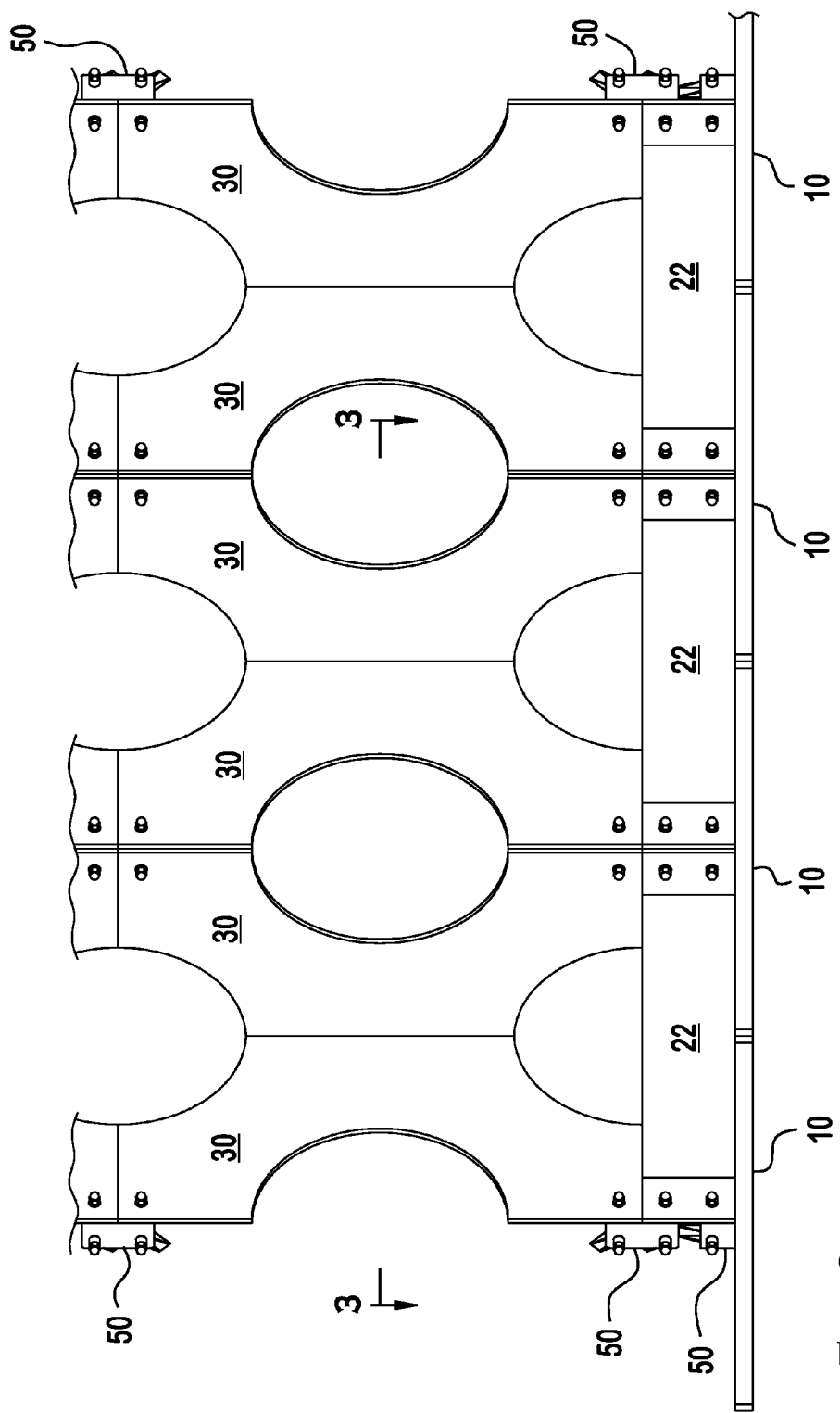
FIG. 2 is a right plan view of the display system according to the invention.
Figure 3:
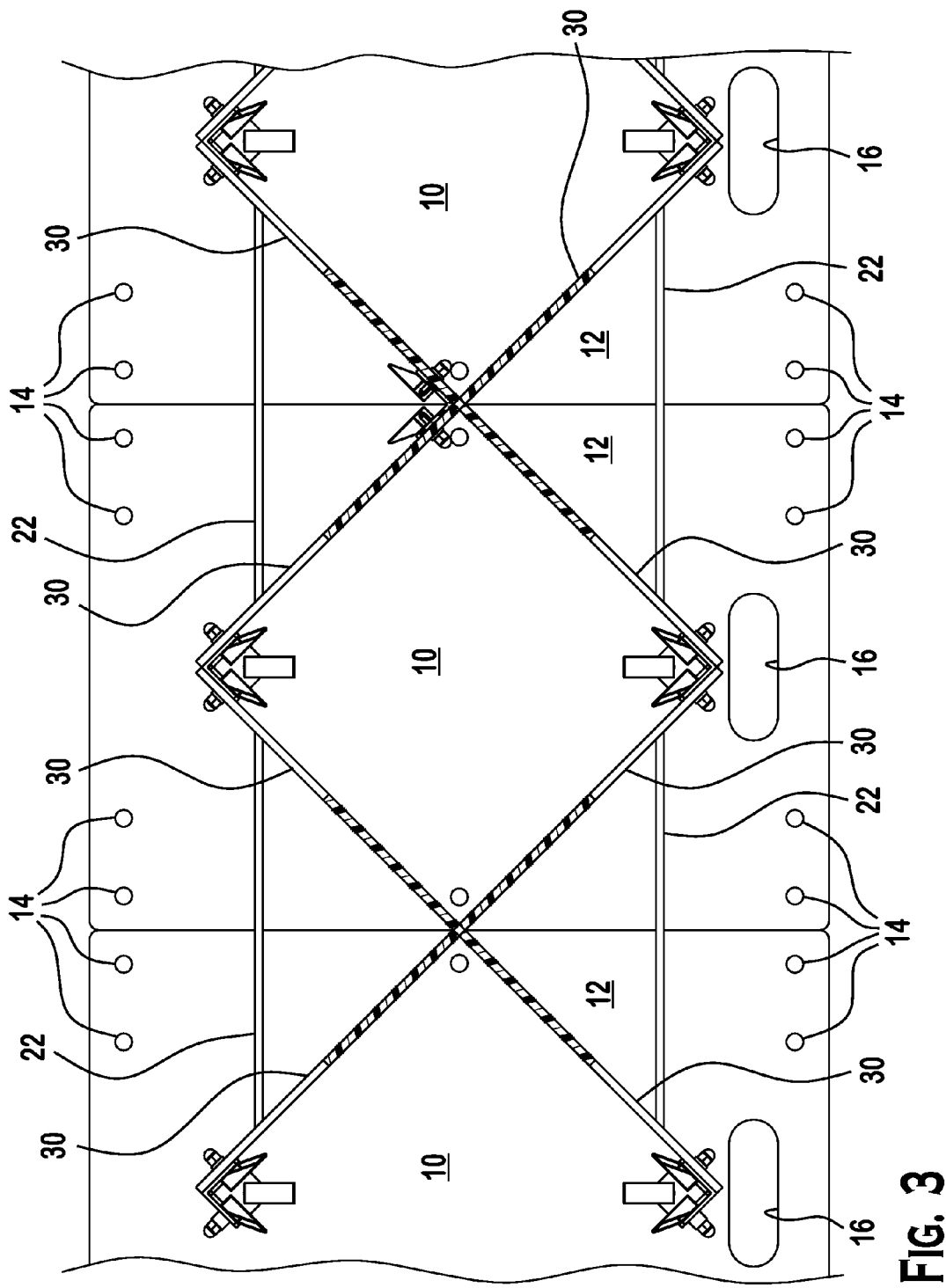
FIG. 3 is another perspective view the display system according to the invention.

First, with reference to FIGS. 1-3, a display system 1 according to an embodiment of the invention is shown. The display system 1 includes the following major components: a plurality of base panels 10, a collapsible structure 20, and a plurality of connectors 50.

With reference to FIGS. 1-4, the base panel 10 will be described.

As shown, the base panel 10 includes a base body 12, a plurality of connector receiving passageways 14, and a grip 16. The base body 12 is a planar object made from a solid structural material, such as metal or aluminum. However, one skilled in the art would appreciate that the base body 12 may be prepared from other structural materials such as fibrous material, plastic, or material composite, and include various polygonal shapes. Further, one skilled in the art would appreciate that the base body 12 may be hollow. The base body 12 should include a major planar surface that is a support surface.

As shown, each connector receiving passageway 14 is an opening extending through an upper surface of the base body 12. In fact, each connector receiving passageway 14 may extend completely through the base body 12, or may be a blind hole that only partial extends through the base body 12. The connector receiving passageway 14 may also include a threaded portion disposed along an inner surface thereof.

In the shown exemplary embodiment, each base panel 10 has twelve (12) connector receiving passageway 14 in a defined configuration. However, one skilled in the should appreciate that other configurations are possible, including more or less connector receiving passageways 14, as shown.

In the shown embodiment, each connector receiving passageway 14 is shaped and sized to the receive one of the plurality of connectors 50. However, in another embodiment, the connector receiving passageway 14 may be a protrusion (not shown), rather than an opening or passageway. In such an embodiment, the connector receiving passageway 14 extends upward from the base body 12 and corresponds to an end of the collapsible structure 20.

Figure 4:
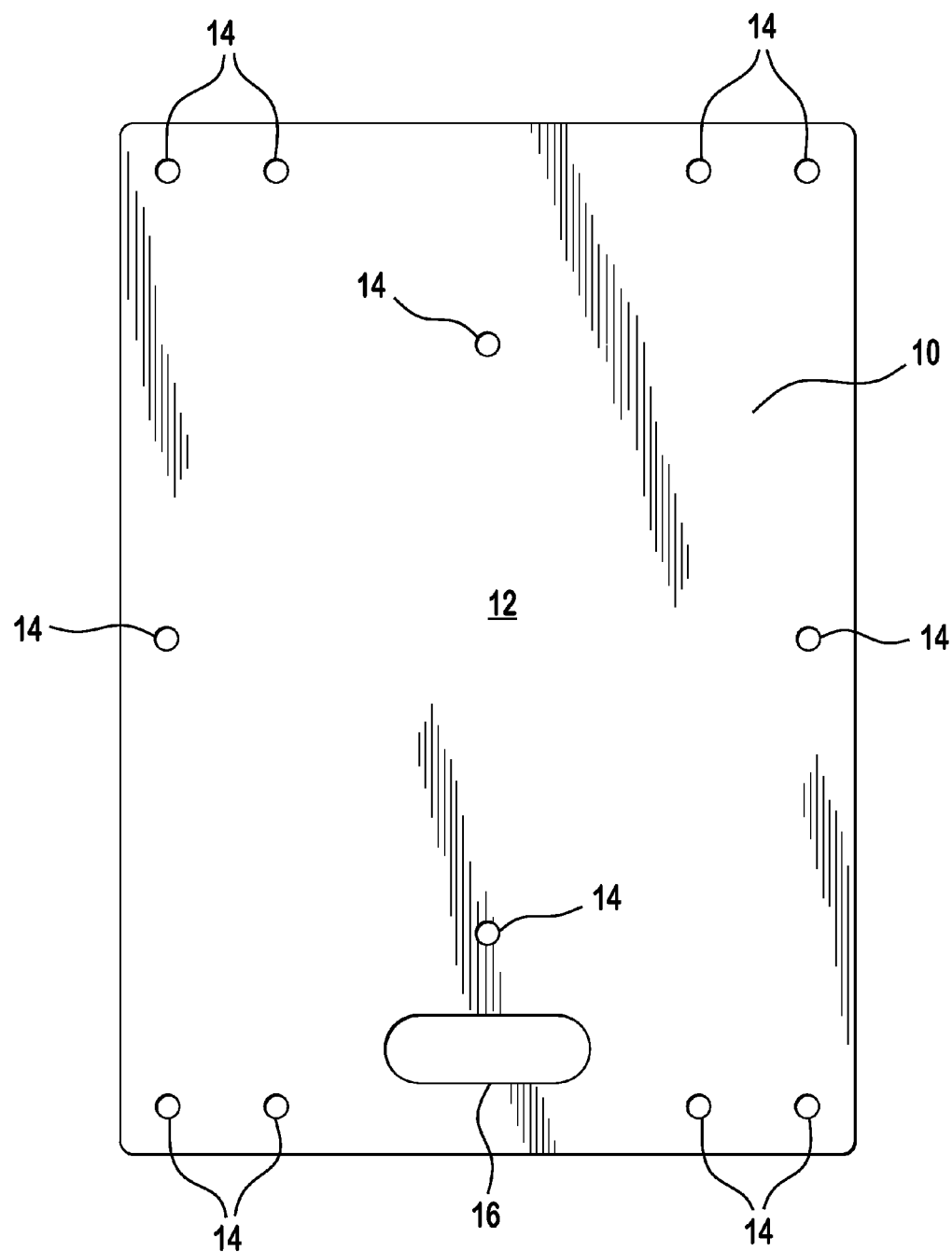
FIG. 4 is a sectional view of the display system according to the invention, taken along line 3-3 in FIG. 2.

As shown in FIG. 4, the grip 16 is an oval shaped opening positioned along a side of the base body 12. The grip 16 may be integral to the base panel 10 or a separate component that attaches to the base panel 10. For instance, in other embodiments, the grip 16 may be an abrasive material, a coating, or resistive pattern disposed along a surface of the base body 12, such as grooved patterns, sand paper, or grit material. Additionally, one skilled in the art would appreciate that other connecting articles may be used, such as a handle, a knob, or other known gripping members.

Now with reference to FIGS. 1 through 8, the collapsible structure 20 will be described. In the shown embodiment, the collapsible structure 20 includes a plurality of base connector panels 22 and a plurality of modular display panels 30.

As shown in FIGS. 5 and 6, each base connector panel 22 is a shaped article. The base connector panel 22, in the shown embodiment, includes a thin rectangular panel body 22a and plurality of extensions 22b.

As shown, the panel body 22a is made from textured material, but could be prepared from a variety of display materials, such as fiberboard, paper, plastic, wood, metal or other material that fits requirements of a particular use. One skilled in the art would appreciate that the shape, size and texture of the base connector panel 22 can be modified and designed for a particular use.

In the shown embodiment, each extension 22b is shaped the same as the panel body but extends away from the panel body 22a at an angle. In the shown embodiment, the extension 22b extends at an approximate 45 degree angle with respect to the panel body 22a. However, one skilled in the art should appreciate that other designs and configurations are possible without departing from the spirit of the invention. For instance, the extension 22b may be shaped differently than shown, or with respect to the shape of the panel body 22a. The extension 22b may extend at different degrees with respect to the panel body 22a, as well. In the shown embodiment, the extension 22b extends at angle that corresponds to an assembly of modular display panels 30 (as will be described later).

As shown, the base connector panel 22 includes a plurality of fastener receiving passageways 24. As shown, each fastener receiving passageway 24 is an opening extending through a surface of the base connector panel 22. In the shown embodiment, each fastener receiving passageway 24 extends completely through the base connector panel 22 and, more particularly, completely through the extension 22b. In the shown embodiment, each extension 22b includes a pair of fastener receiving passageways 24. However, one skilled in the art should appreciate that other designs and configurations are possible. For instance, fastener receiving passageway 24 may be a blind hole that only partial extends through the base connector panel 22. The fastener receiving passageway 24 may also include a threaded portion disposed along an inner surface thereof. Additionally, the base connector panel 22 may include more or less fastener receiving passageway 24 than are shown.

In the shown embodiment, each fastener receiving passageway 24 is shaped and sized to the receive one of the plurality of connectors 50. However, in another embodiment, the fastener receiving passageway 24 may be a protrusion (not shown), rather than an opening or passageway. In such an embodiment, the fastener receiving passageway 24 extends outward from the base connector panel 22 and corresponds to adapt to the connectors 50.

Now with reference to FIGS. 7 and 8, the modular display panels 30 will be described.

As shown, each modular display panel 30 is a shaped article having a panel body 32, a panel connector 34, and plurality of fastener receiving passageways 36. The modular display panel 30, in the shown embodiment, includes a thin squared panel body 32 with cut out sections 33 to define an overall ornamental design of the modular display panel 30. The panel body 32 is made from textured material, but could be prepared from a variety of display materials, such as fiberboard, paper, plastic, wood, metal or other material that fits requirements of a particular use. One skilled in the art would appreciate that the shape, size and texture of the modular display panel 30 can be modified and designed for a particular use or ornamental effect.

As shown, the cut out sections 33 are patterned notches cut out from edges of the panel body 32. In the shown embodiment, each cut out section 33 is a semi-circular shaped notch extending from an outer edge of the panel body 32 and extending toward a substantial center of the panel body 32. One skilled in the art would appreciate that the shape, size and texture of the cut out section is a matter of preference and can be modified and designed to provide an ornamental effect.

Figure 8:
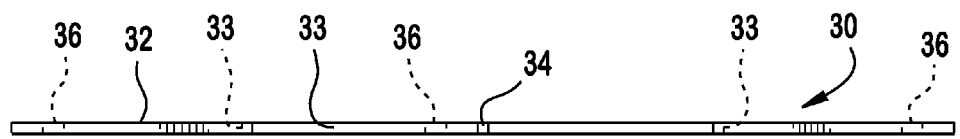
FIG. 8 is top view of the modular display panel of FIG. 7.
Figure 7:
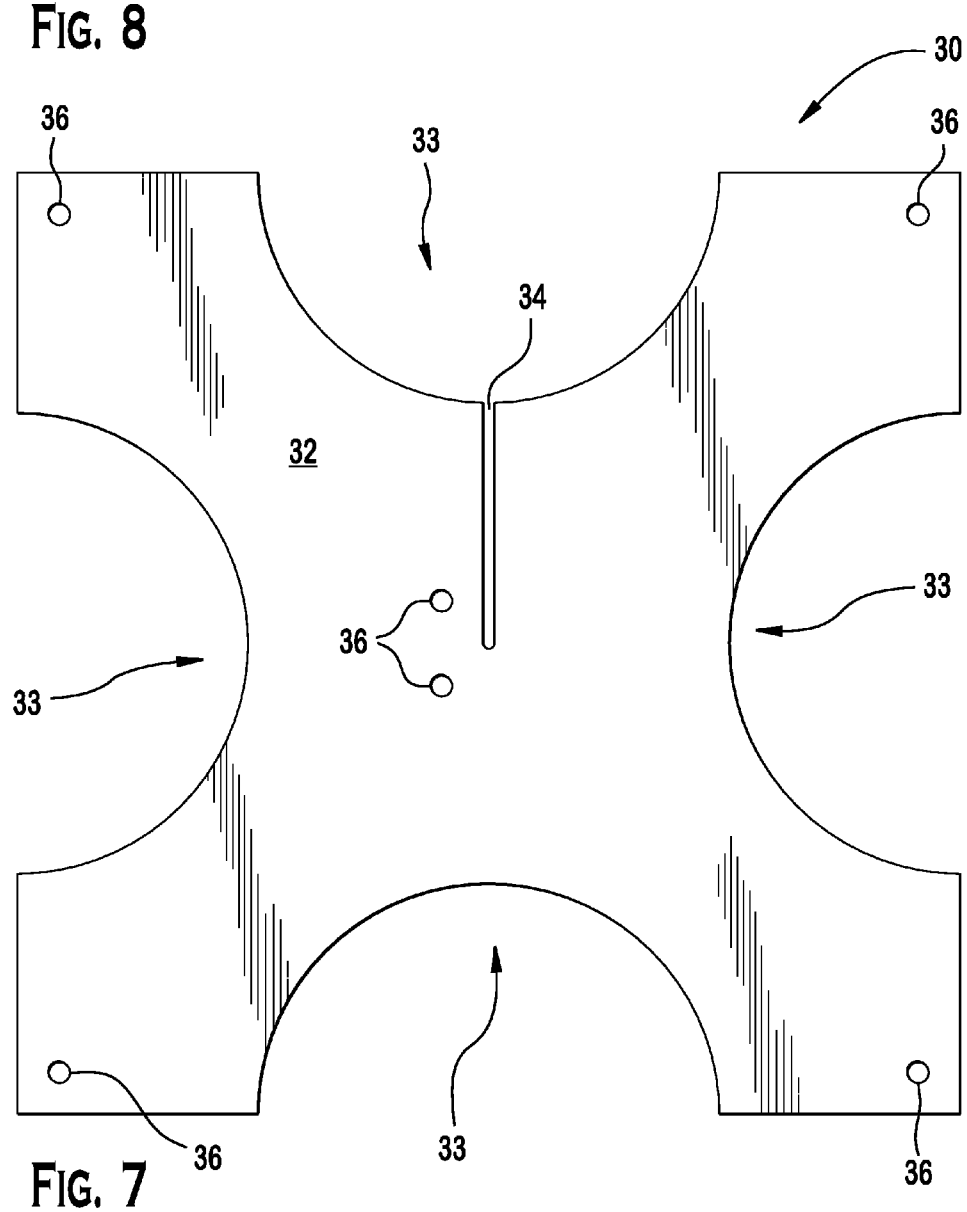
FIG. 7 is front view of a modular display panel of the display system according to the invention.
Figure 11:
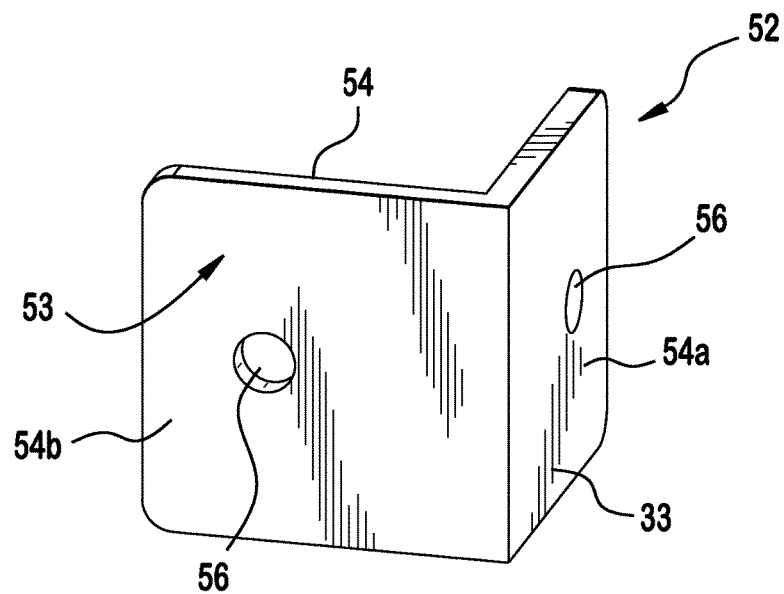
FIG. 11 is a partial perspective view of the panel connector of FIG. 9.

As shown in FIGS. 7 and 8, the panel connector 34 is a slot running transversely across the panel body 32, and more particularly, a panel connector 34 that extends completely through the panel body 32. In the shown embodiment, the panel connector 34 extends from an edge of the cut out section 33 (i.e. top of the semi-circle) to a substantial center section of the panel body 32. While in the shown embodiment the panel connector 34 runs from top to bottom, one skilled in the art should appreciate that the panel connector 34 could run from side to side or even in another embodiment diagonally. Depending on the ornamental design of the modular display panel 30, the panel connector 34 may extend from an outer edge of the panel body 32. For instance, if the modular display panel 30 does not include a cut out section 33, the panel connector 34 may extend from the outer edge of the panel body 32 toward a substantial center thereof.

As shown in FIGS. 1-4, the a plurality of connectors 50 include a plurality of body connectors 52, a plurality of base connectors 60, a plurality of structure connectors 68, and a plurality of support base connectors 76.

Now, with reference to 9-11, the plurality of body connectors 52 will be described.

As shown, the body connector 52 includes a plate body 54 with a plurality of fastener receiving passageways 56, and a plurality of fasteners 58.

In the shown embodiment, the body connector 52 is a plastic article, but could be prepared from other known materials available to one skilled in the art, including metals, fibrous material, or composites.

In the embodiment shown, the plate body 54 is a rigid planar member having a first planar body section 54a and a second planar body section 54b. In the shown embodiment, the first planar body section 54a is positioned orthogonal to the second planar body section 54b with adjacent sides joined at an approximate right angle. In the shown embodiment, the plate body 54 is a monolithic structure. However, in other embodiments, the plate body 54 may be separate pieces that are joined together using known connection means, such as mechanical welds, braces, brackets, adhesives, etc. While the shown embodiment demonstrates that the first planar body section 54a is positioned orthogonal to the second planar body section 54b, one skilled in the art should appreciate that the first planar body section 54a may be positioned with respect to the second planar body section 54b at various angles.

As shown, the first planar body section 54a and the second planar body section 54b include a smooth outer surfaces 53. In the embodiment shown, the first planar body section 54a and the second planar body section 54b are square, but could be shaped from other known polygonal shapes.

As shown in FIGS. 9 and 10, each fastener receiving passageways 56 extends through the plate body 54. More particularly, in the shown embodiment, the fastener receiving passageways 56 are positioned on the first planar body section 54a and the second planar body section 54b. In particular, the fastener receiving passageways 56 are positioned adjacent to an outer edge of the plate body 54. In the shown embodiment, one fastener receiving passageway 56 is disposed on the first planar body section 54a and another fastener receiving passageway 56 is disposed on the second planar body section 54b. One skilled in the art should appreciate that the fastener receiving passageway 56 may be place in different positions depending on use of the fastener 58.

In an alternative embodiment, the plate body 54 may include panel receiving sections (not shown), which are indentations along the flat front surface meant to receive a section of the modular display panel 30, for a more controlled fit of the modular display panel 30 and the body connector 52.

As shown in FIG. 10, each fastener 58 is a swell latch having a lever 58a attached to a screw 58b, a rubber washer 58c, and a nut 58d connectable with the screw 58b. The screw 58b is sized and shaped to extend through fastener receiving passageways 56 and the plurality of fastener receiving passageways 24, 36 of the base connector panel 22 or the modular display panel 30, respectively. The rubber washer 58c is sized to fit within the plurality of fastener receiving passageways 24, 36 of the base connector panel 22 or the modular display panel 30, respectively. One skilled in the art would appreciate that the fastener 58, in other embodiments, may be any known type of fastener, such a latch, screw, nut and bolt, hook and loop fastener, and removable adhesive.

In the shown embodiment, each fastener 58 is sized the same. However, each fastener 58 may be sized differently. For instance, the screw 58b length, a rubber washer 58c diameter, and a nut 58d diameter may vary.

Figure 12:
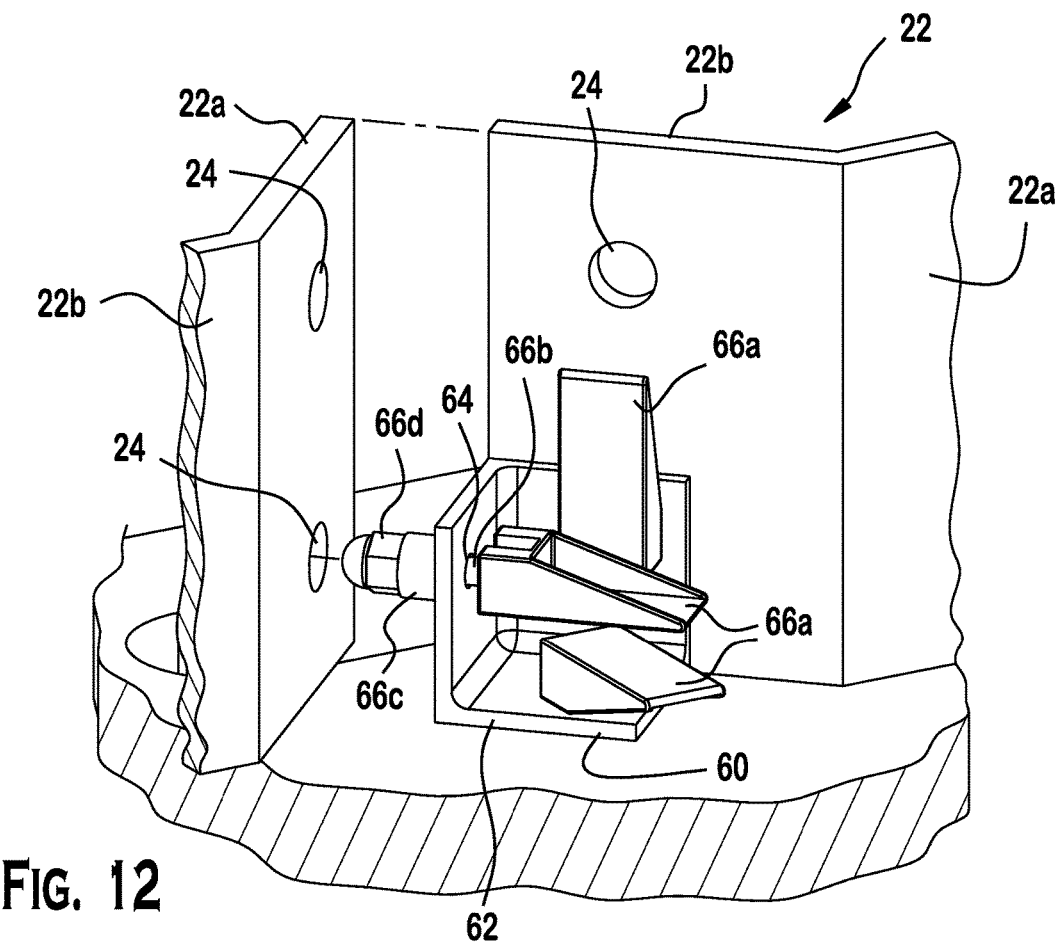
FIG. 12 is a perspective view of a base connector of the display system according to the invention.
Figure 13:
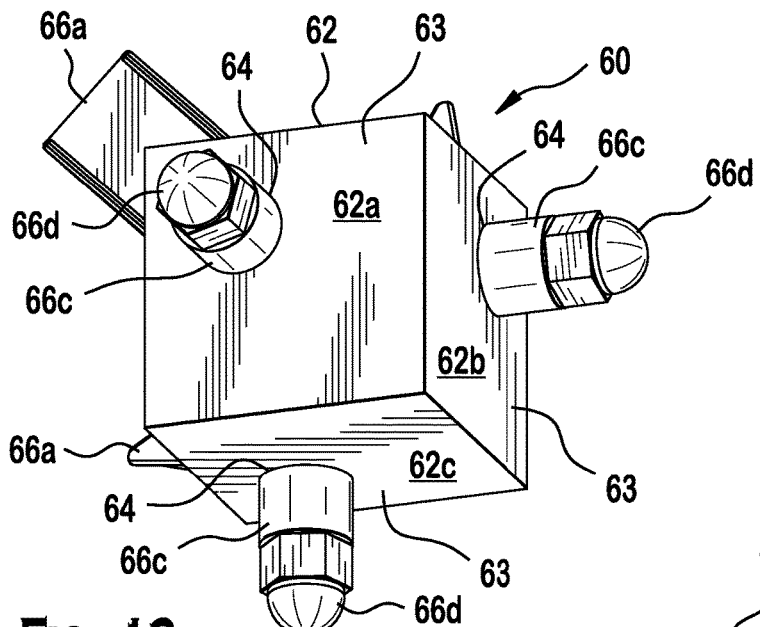
FIG. 13 is a perspective view of the base connector of FIG. 12.

With reference to FIGS. 12 and 13, the plurality of base connectors 60 will be described.

As shown, the base connector 60 includes a plate body 62 with a plurality of fastener receiving passageways 64, and a plurality of fasteners 66.

In the shown embodiment, the base connector 60 is a plastic article, but could be prepared from other known materials available to one skilled in the art, including metals, fibrous material, or composites.

In the embodiment shown, the plate body 62 is a rigid planar member having a first planar body section 62a, a second planar body section 62b, and a third planar body section 62c. In the shown embodiment, the first planar body section 62a is positioned orthogonal to the second planar body section 54b with adjacent sides joined at an approximate right angle. Additionally, the third planar body section 62c is positioned orthogonal to the first planar body section 62a and the second planar body section 62b. As shown, the adjacent sides of the first planar body section 62a, second planar body section 62b, and third planar body section 62c are joined at right angles. In the shown embodiment, the plate body 62 is a monolithic structure. However, in other embodiments, the plate body 62 may be separate pieces that are joined together using known connection means, such as mechanical welds, braces, brackets, adhesives, etc.

As shown, the first planar body section 62a, the second planar body section 62b, and the third planar body section 62c include smooth outer surfaces 63. In the embodiment shown, the first planar body section 62a, the second planar body section 62b, and the third planar body 62c are square, but could be shaped from other known polygonal shapes.

As shown in FIG. 12, each fastener receiving passageways 64 extends through the plate body 62. More particularly, in the shown embodiment, the fastener receiving passageways 64 are positioned on the first planar body section 62a, the second planar body section 62b, and the third planar body section 62c. In particular, the fastener receiving passageways 64 are positioned adjacent to an outer edge of the plate body 62. In the shown embodiment, one fastener receiving passageway 64 is disposed on the first planar body section 62a, another fastener receiving passageway 64 is disposed on the second planar body section 62b, and yet another fastener receiving passageway 64 is disposed on the third planar body section 62c. One skilled in the art should appreciate that the fastener receiving passageways 64 may be positioned in different positions that are shown, and may depend on use of the fastener 66.

In an alternative embodiment, the plate body 62 may include panel receiving sections (not shown), which are indentations along the flat front surface meant to receive a section of the modular display panel 30, for a more controlled fit of the modular display panel 30 or the base connector panel 22 and the base connector 60.

As shown in FIG. 12, each fastener 66 is a swell latch having a lever 66a attached to a screw 66b, a rubber washer 66c, and a nut 66d connectable with the screw 66b. The screw 66b is sized and shaped to extend through fastener receiving passageways 64 and the plurality of fastener receiving passageways 24, 36 of the base connector panel 22 or the modular display panel 30, respectively. The rubber washer 66c is sized to fit within the plurality of fastener receiving passageways 24, 36 of the base connector panel 22 or the modular display panel 30, respectively. In addition, the rubber washer 66c may be sized to fit the connector receiving passageway 14 of the base panel 10. One skilled in the art would appreciate that the fastener 66, in other embodiments, may be any known type of fastener, such a latch, screw, nut and bolt, hook and loop fastener, and removable adhesive.

In the shown embodiment, each fastener 66 is sized the same. However, each fastener 66 may be sized differently. For instance, the screw 66b length, a rubber washer 66c diameter, and a nut 66d diameter may vary. In one embodiment, the fastener 66 for the fastener receiving passageway 64 of the third planar body section 62c may be sized differently than the fasteners 66 used for the fastener receiving passageways 64 of the first planar body section 62a of the second planar body section 62b.

Figure 14:
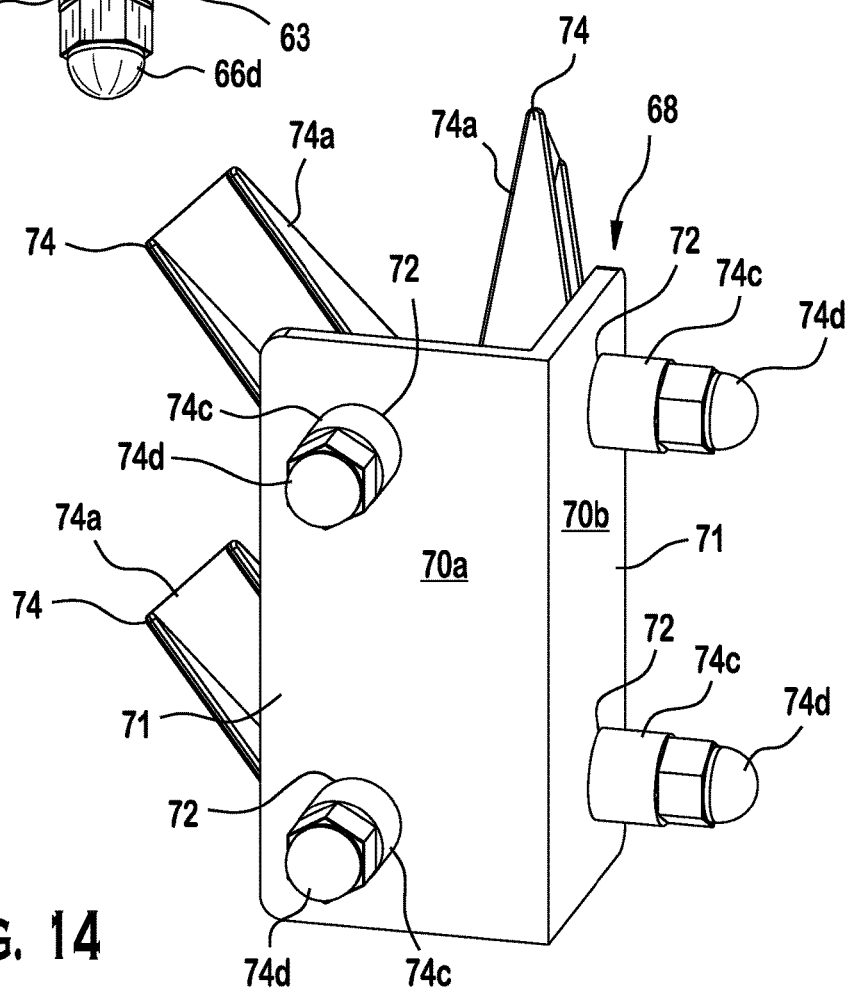
FIG. 14 is a perspective view of a structure connector of the display system according to the invention.
Figure 15:
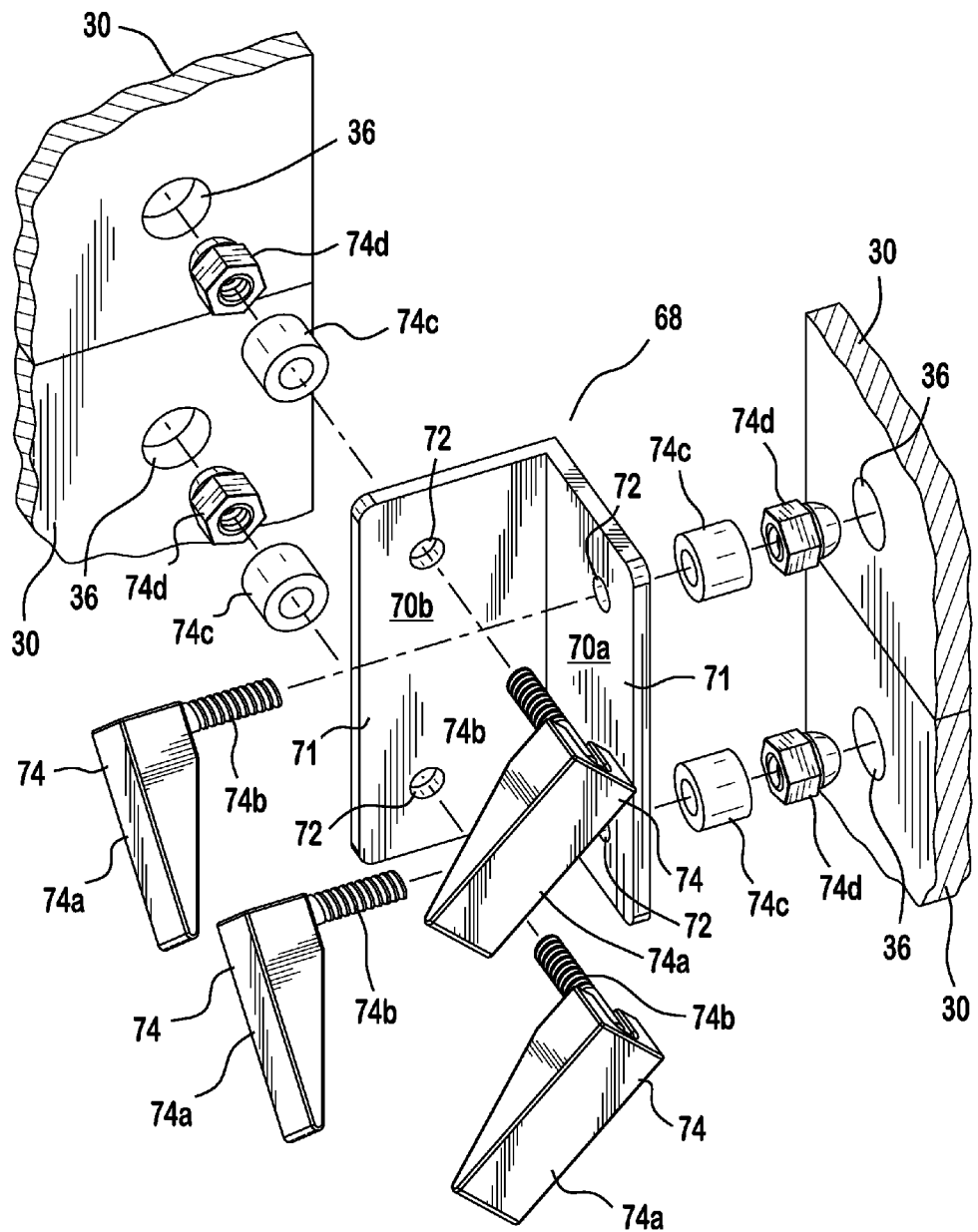
FIG. 15 is an exploded perspective view of the structure connector of FIG. 14.

With reference to FIGS. 14 and 15, the plurality of structure connectors 68 will be described.

As shown, the structure connector 68 includes a plate body 70 with a plurality of fastener receiving passageways 72, and a plurality of fasteners 74.

In the shown embodiment, the structure connector 68 is a plastic article, but could be prepared from other known materials available to one skilled in the art, including metals, fibrous material, or composites.

In the embodiment shown, the plate body 70 is a rigid planar member having a first planar body section 70a and a second planar body section 70b. In the shown embodiment, the first planar body section 70a is positioned orthogonal to the second planar body section 70b with adjacent sides joined at an approximate right angle. In the shown embodiment, the plate body 70 is a monolithic structure. However, in other embodiments, the plate body 70 may be separate pieces that are joined together using known connection means, such as mechanical welds, braces, brackets, adhesives, etc. While the shown embodiment demonstrates that the first planar body section 70a is positioned orthogonal to the second planar body section 70b, one skilled in the art should appreciate that the first planar body section 70a may be positioned with respect to the second planar body section 70b at various angles.

As shown, the first planar body section 70a and the second planar body section 70b include a smooth outer surfaces 71. In the embodiment shown, the first planar body section 70a and the second planar body section 70b is rectangular, but could be shaped from other known polygonal shapes.

As shown in FIGS. 9 and 10, each fastener receiving passageways 72 extends through the plate body 70. More particularly, in the shown embodiment, the fastener receiving passageways 72 are positioned on the first planar body section 70a and the second planar body section 70b. In particular, the fastener receiving passageways 72 are positioned adjacent to an outer edge of the plate body 70. In the shown embodiment, two fastener receiving passageways 72 are disposed on the first planar body section 70a and two other fastener receiving passageways 72 are disposed on the second planar body section 70b. More particularly, in the shown embodiment, the fastener receiving passageways 72 are positioned along corners of the plate body 70. One skilled in the art should appreciate that the fastener receiving passageways 72 may be positioned in different positions that are shown, and may depend on use of the fastener 74.

In an alternative embodiment, the plate body 70 may include panel receiving sections (not shown), which are indentations along the flat front surface meant to receive a section of the modular display panel 30, for a more controlled fit of the modular display panel 30 and the structure connector 68.

As shown in FIG. 15, like the fasteners 58, 66, each fastener 74 is a swell latch having a lever 74a attached to a screw 74b, a rubber washer 74c, and a nut 74d connectable with the screw 74b. The screw 74b is sized and shaped to extend through fastener receiving passageways 72 and the plurality of fastener receiving passageways 24, 36 of the base connector panel 22 or the modular display panel 30, respectively. The rubber washer 74c is sized to fit within the plurality of fastener receiving passageways 24, 36 of the base connector panel 22 or the modular display panel 30, respectively. One skilled in the art would appreciate that the fastener 74, in other embodiments, may be any known type of fastener, such a latch, screw, nut and bolt, hook and loop fastener, and removable adhesive.

In the shown embodiment, each fastener 74 is sized the same. However, each fastener 74 may be sized differently. For instance, the screw 74b length, a rubber washer 74c diameter, and a nut 74d diameter may vary.

Figure 18:
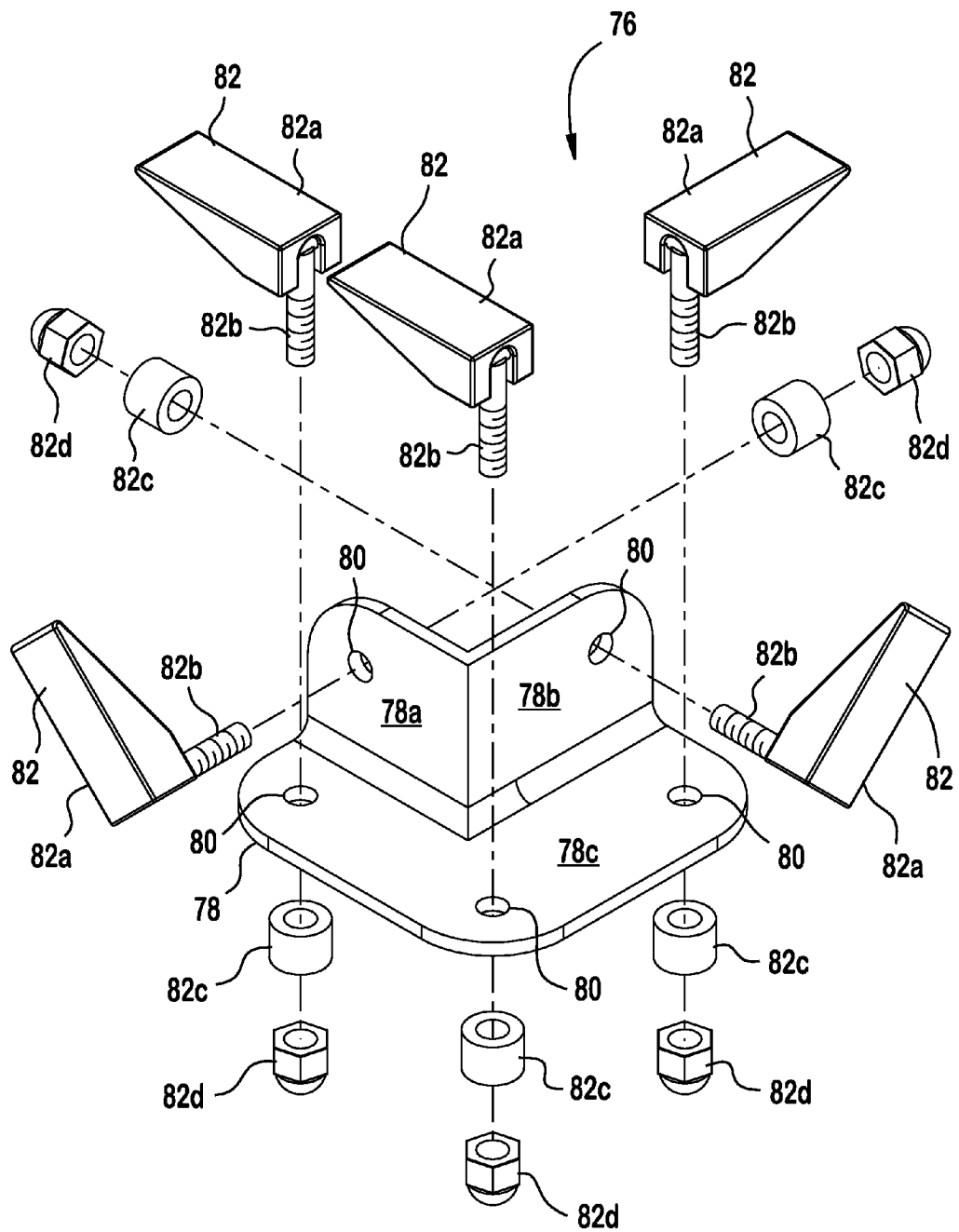
FIG. 18 is an exploded perspective view of the support base connector of FIG. 16.

Now, with reference to FIGS. 16-18, the plurality of support base connectors 76 will be described.

As shown, the support base connector 76 includes a plate body 78 with a plurality of fastener receiving passageways 80, and a plurality of fasteners 82.

In the shown embodiment, the support base connector 76 is a plastic article, but could be prepared from other known materials available to one skilled in the art, including metals, fibrous material, or composites.

In the embodiment shown, the plate body 78 is a rigid planar member having a first planar body section 78a, a second planar body section 78b, and a third planar body section 78c. In the shown embodiment, the first planar body section 78a is positioned orthogonal to the second planar body section 54b with adjacent sides joined at an approximate right angle. Additionally, the third planar body section 78c is positioned orthogonal to the first planar body section 78a and the second planar body section 78b. As shown, the adjacent sides of the first planar body section 78a, second planar body section 78b, and third planar body section 78c are joined at right angles. In the shown embodiment, the plate body 78 is a monolithic structure. However, in other embodiments, the plate body 78 may be separate pieces that are joined together using known connection means, such as mechanical welds, braces, brackets, adhesives, etc.

As shown, the first planar body section 78a, the second planar body section 78b, and the third planar body section 78c include smooth outer surfaces 79. In the embodiment shown, the first planar body section 78a and the second planar body section 78b are square, but could be shaped from other known polygonal shapes. The third planar body section 78c is an L-shaped planar panel with an orthogonal edge connecting to adjacent side of the first planar body section 78a and the second planar body section 78b. As shown, planar surfaces of the third planar body section 78c are positioned orthogonal to planar surfaces of the first planar body section 78a and the second planar body section 78b. Also, in the shown embodiment, the third planar body section 78c is positioned opposite and extends away from the outer surfaces of the first planar body section 78a and the second planar body section 78b. One skilled in the art should appreciate that the fastener receiving passageways 80 may be positioned in different positions that are shown, and may depend on use of the fastener 82.

As shown in FIG. 12, each fastener receiving passageways 80 extends through the plate body 78. More particularly, in the shown embodiment, the fastener receiving passageways 80 are positioned on the first planar body section 78a, the second planar body section 78b, and the third planar body section 78c. In particular, the fastener receiving passageways 80 are positioned adjacent to an outer edge of the plate body 78. In the shown embodiment, one fastener receiving passageway 80 is disposed on the first planar body section 78a, another fastener receiving passageway 80 is disposed on the second planar body section 78b. Two or more fastener receiving passageways 80 are provided on the third planar body section 78c. In the shown embodiment, approximately three fastener receiving passageways 80 are provided on the third planar body section 78c. More particularly, two fastener receiving passageways 80 are provided on ends of the third planar body section 78c, while another fastener receiving passageways 80 is provided about a proximate middle of the third planar body section 78c.

In an alternative embodiment, the plate body 78 may include panel receiving sections (not shown), which are indentations along the flat front surface meant to receive a section of the modular display panel 30, for a more controlled fit of the modular display panel 30 or the base connector panel 22 and the support base connector 76.

As shown in FIG. 12, each fastener 82 is a swell latch having a lever 82a attached to a screw 82b, a rubber washer 82c, and a nut 82d connectable with the screw 82b. The screw 82b is sized and shaped to extend through fastener receiving passageways 80 and the plurality of fastener receiving passageways 24, 36 of the base connector panel 22 or the modular display panel 30, respectively. The rubber washer 82c is sized to fit within the plurality of fastener receiving passageways 24, 36 of the base connector panel 22 or the modular display panel 30, respectively. In addition, the rubber washer 82c may be sized to fit the connector receiving passageway 14 of the base panel 10. One skilled in the art would appreciate that the fastener 82, in other embodiments, may be any known type of fastener, such as a latch, screw, nut and bolt, hook and loop fastener, and removable adhesive.

In the shown embodiment, each fastener 82 is sized the same. However, each fastener 82 may be sized differently. For instance, the screw 82b length, a rubber washer 82c diameter, and a nut 82d diameter may vary. In one embodiment, the fastener 82 for the fastener receiving passageway 82 of the third planar body section 78c may be sized differently than the fasteners 82 used for the fastener receiving passageways 80 of the first planar body section 78a of the second planar body section 78b.

Now with reference to the drawings, assembly of the collapsible structure 20 for the display system 1 will be discussed.

As shown in FIGS. 1 through 3, the collapsible structure 20 is assembled by connecting the plurality of base connector panels 22 and a plurality of modular display panels 30 using the plurality of connectors 50.

Figure 19:
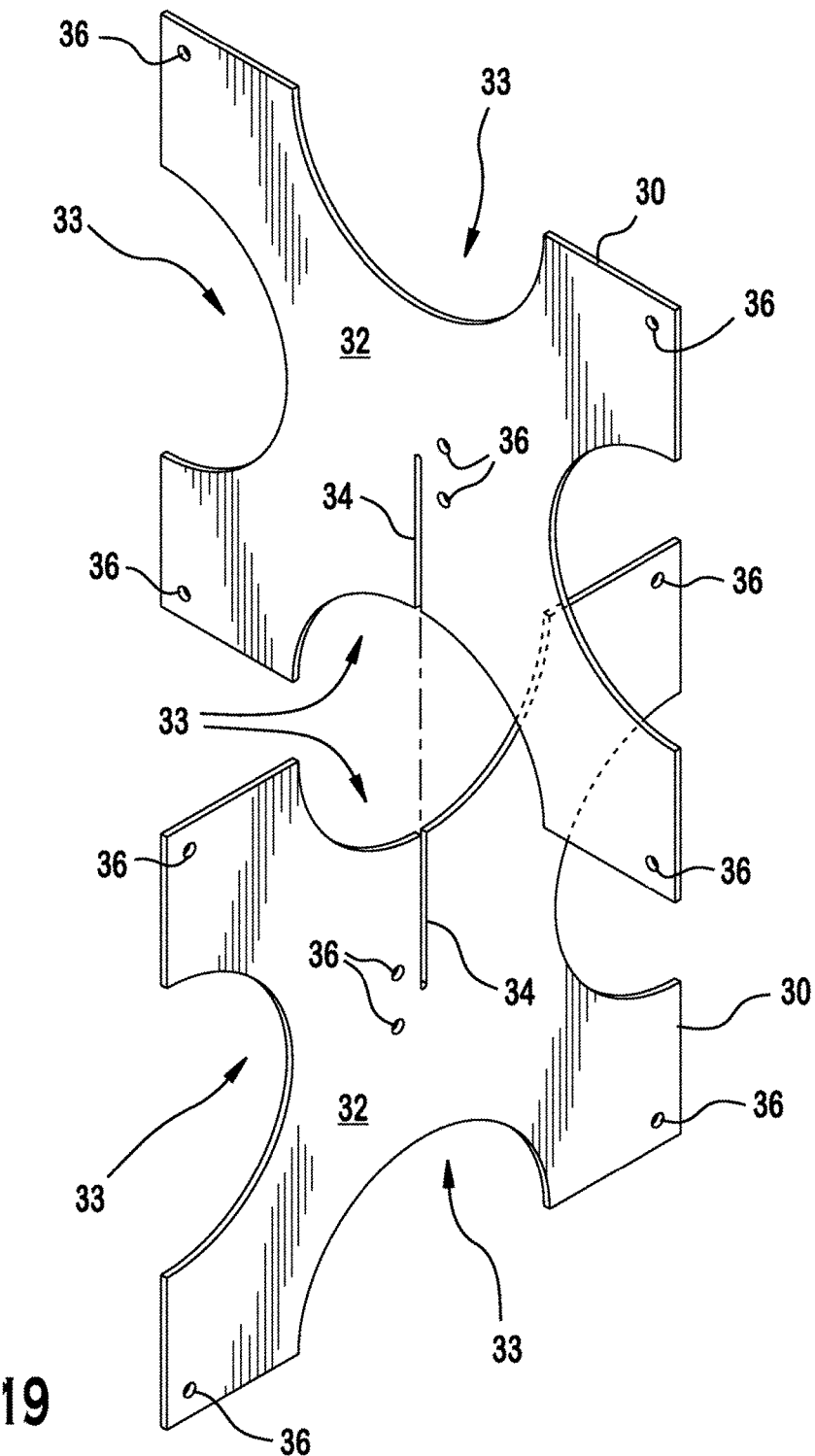
FIG. 19 is an exploded perspective view of an arrangement of modular display panels for the display system according to the invention.

In the embodiment shown of FIG. 19, a pair of modular display panels 30 fitted with each other to create an x-shaped arrangement. In particular, a panel connector 34 from one modular display panels 30 receives a slot from another modular display panel 30 until ends of the panel connectors 34 engage each other. The modular display panels 30 then overlap each other and form the x-shaped arrangement. One skilled in the art would appreciate that the shape, size and texture of the cut out section is a matter of preference and can be modified and designed to provide an ornamental effect. Therefore, if the modular display panels 30 are designed differently than shown, when a pair of modular display panels 30 is assembled, a different arrangement may be provided.

Figure 20:
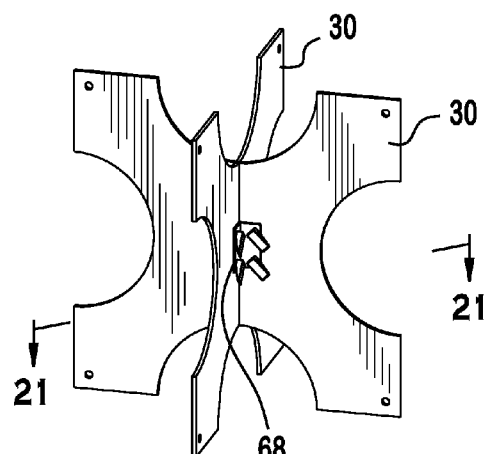
FIG. 20 is a perspective view of the arrangement of modular display panels of FIG. 19.
Figure 21:
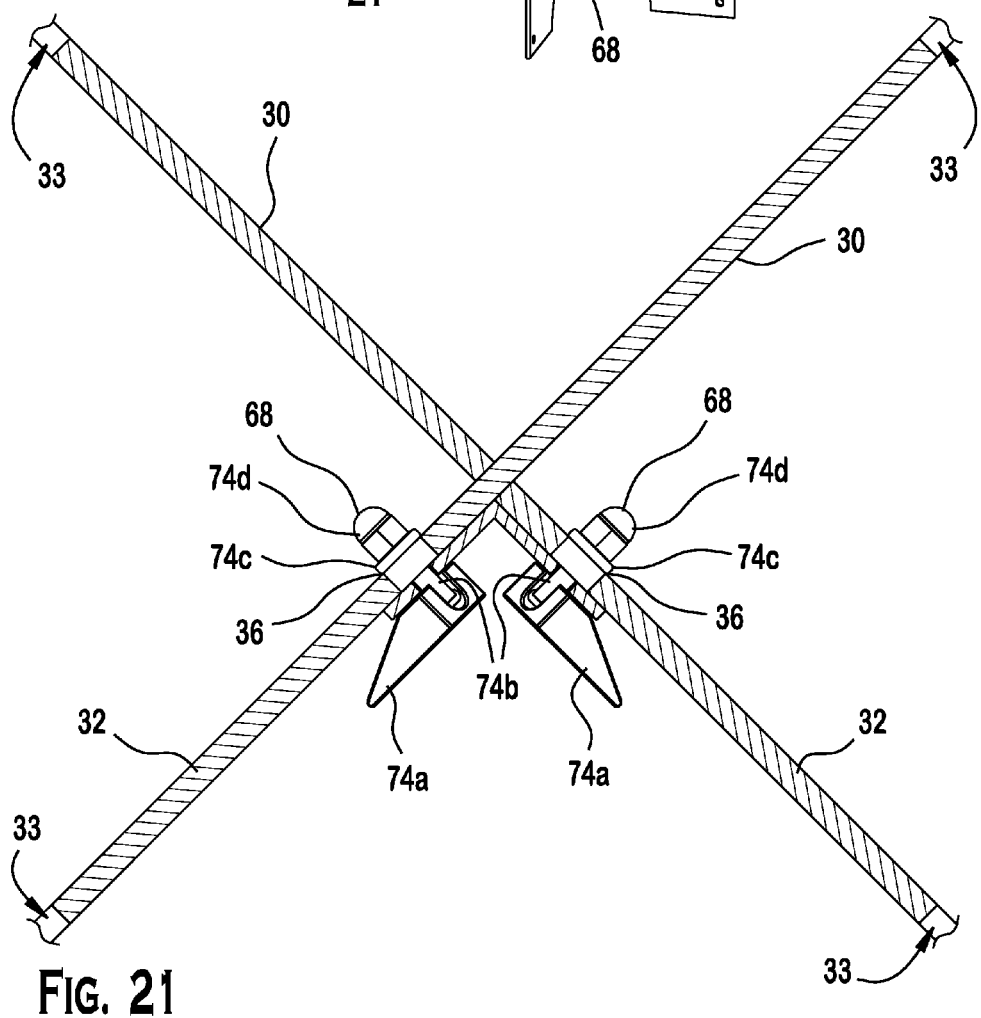
FIG. 21 is a sectional view of the arrangement of modular display panels taken along line 21-21 of FIG. 20.

As shown in FIGS. 20 and 21, a structure connector 68 is used to secure the modular display panels 30 together in the x-shaped arrangement. The plate body 70 and, more particularly, the outer surfaces 71 of the first planar body section 70a and the second planar body section 70b are positioned flush with the panel body 32 of each modular display panel 30.

In the embodiment shown, the screw 74b passes through of one of the fastener receiving passageways 72 and the rubber washer 74c, and then engages with the nut 74d. The lever 74a is positioned opened (i.e. parallel to the screw 74b) and then used to tighten the screw 74b and the nut 74d together, which compresses the rubber washer 74c there between. Each modular display panel 30 is then pressed against a surface of the plate body 70, with the rubber washer 74c and nut 74d passing through the fastener receiving passageways 36. The rubber washer 74c is sized to fit in the fastener receiving passageways 36. When the rubber washer 74c is compressed tightly by the lever 74a in a closed position (i.e. perpendicular to the screw 74b), the rubber washer 74c extends radially outward, gripping the fastener receiving passageways 6 and securing the modular display panels 30 against the plate body 70 and, more particularly, the outer surfaces 71 of the first planar body section 70a and the second planar body section 70b.

Figure 22:
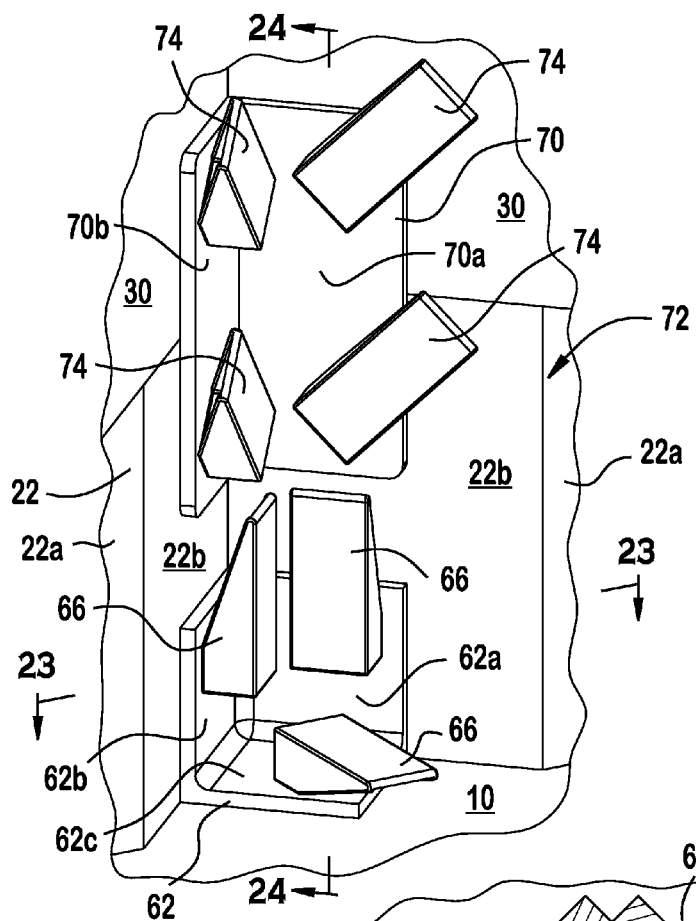
FIG. 22 is a close perspective view of the display system according to the invention, showing assembly thereof.

As shown in in FIG. 22, a pair of base connector panels 22 can be strung together. In particular, in the embodiment shown, extensions 22b from adjacent base connector panels 22 are positioned next to each other. Edges of the extensions 22b abut each other.

As shown in FIG. 22, a base connector 60 is used to secure the pair of base connector panels 22 together in a string arrangement. The plate body 62 and, more particularly, the outer surfaces 63 of the first planar body section 62a and the second planar body section 62b are positioned flush with the panel body of each extension 22b of the pair of base connector panels 22.

Figure 23:
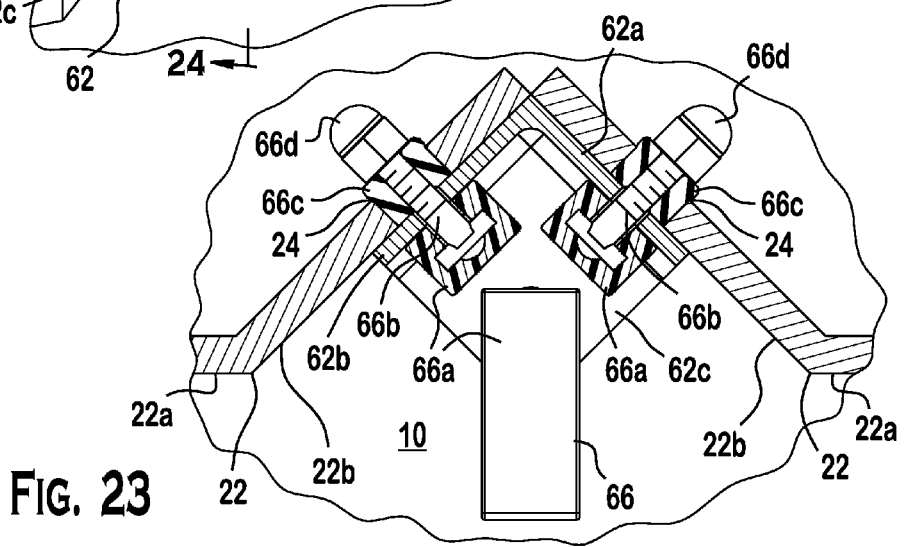
FIG. 23 is a sectional view of the display system taken along line 23-23 of FIG. 22.
Figure 24:
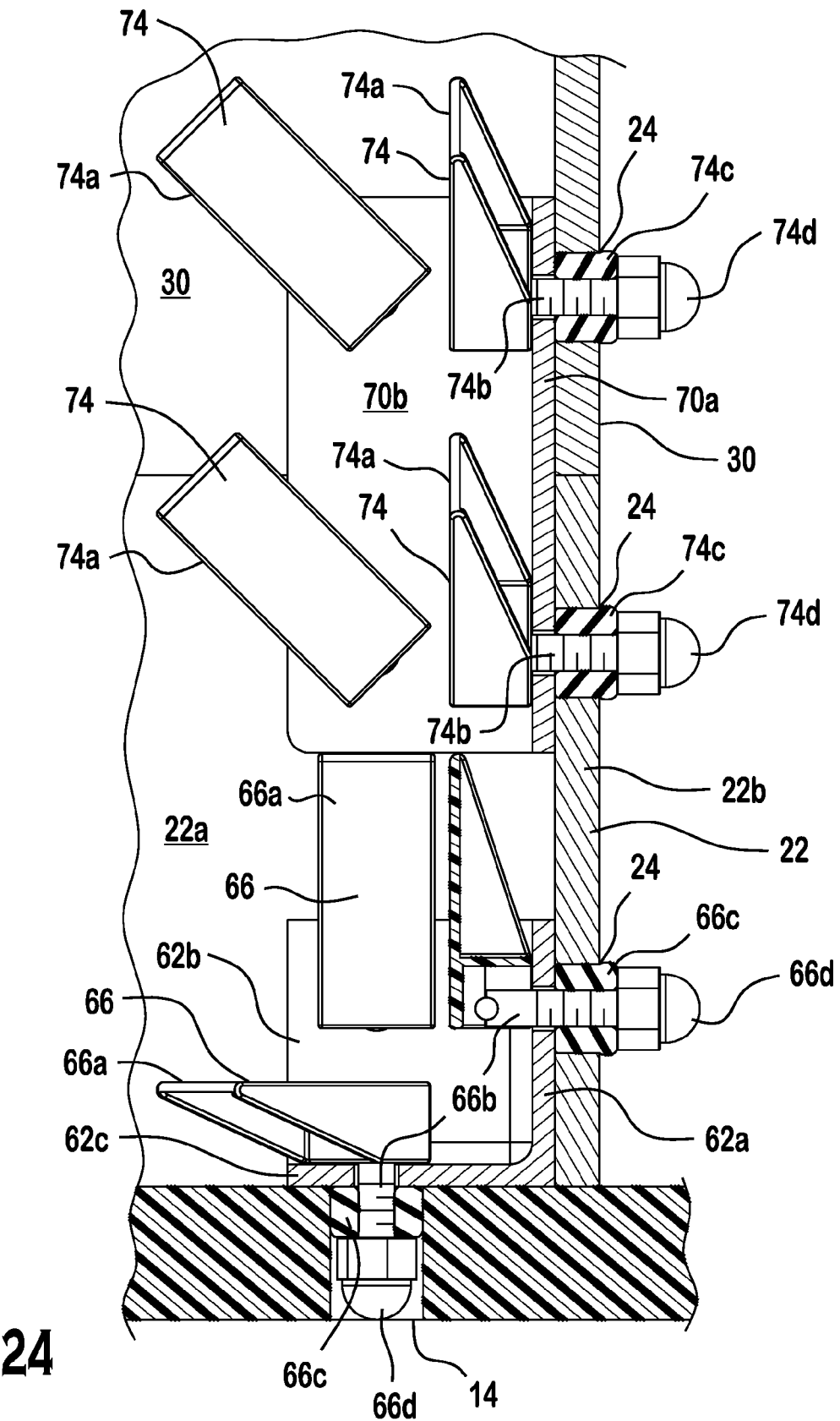
FIG. 24 is a sectional view of the display system taken along line 24-24 of FIG. 22.

As shown in FIG. 23-24, the screw 66b passes through of one of the fastener receiving passageways 36 and the rubber washer 66c, and then engages with the nut 66d. The lever 66a is positioned opened (i.e. parallel to the screw 66b) and then used to tighten the screw 66b and the nut 66d together, which compresses the rubber washer 66c there between. Each base connector panel 22, extension 22b, is then pressed against a surface of the plate body 62, with the rubber washer 66c and nut 66d passing through the fastener receiving passageways 24. The rubber washer 66c is sized to fit in the fastener receiving passageways 24. When the rubber washer 66c is compressed tightly by the lever 66a in a closed position (i.e. perpendicular to the screw 66b), the rubber washer 66c extends radially outward, gripping the fastener receiving passageways 24 and securing the base connector panels 22 against the plate body 62 and, more particularly, the outer surfaces 63 of the first planar body section 62a and the second planar body section 62b.

As shown in FIG. 22-24, pairings of modular display panels 30 can be assembled together, side-by-side in the embodiment shown, using the structure connector 68, and in the same manner as described above. Additionally, the bottom pair of fasteners 74 of the structure connector 68 can be used to connect the base connector panel 22 and the modular display panel 30 together. In the embodiment shown, the structure connector 68 is used to connect a pair of base connector panels 22 with a pair of modular display panels 30.

Now, with reference to FIGS. 2-5, an assembly of use for the shown display system 1 will be described.

In general, as shown in FIGS. 1-3, the display system 1 is assembled such that the collapsible structure 20 is positioned on the base panels 10, as a setting or background for a scene, event or situation.

In general, a plurality of base panels 10 support the collapsible structure 20, while a plurality of connectors 50 connect plurality of modular display panels 30 and the base connector panels 22. As a result, the collapsible structure 20 is rigidly supported by the base panels 10 and the multiple connections using the connectors 50.

Firstly, as shown in FIGS. 1-3, the base panels 10 are lined up on a support surface and the collapsible structure 20 is positioned there above.

As show in FIG. 24, the collapsible structure 20 is secured to the base panel 10 using the base connector 60. The plate body 62 and, more particularly, the outer surface 63 of the third planar body section 62*c* is positioned flush with base body 12.

As shown in FIG. 23-24, the screw 66*b* passes through of one of the connector receiving passageways 24 and the rubber washer 66*c*, and then engages with the nut 66*d*. The lever 66*a* is positioned opened (i.e. parallel to the screw 66*b*) and then used to tighten the screw 66*b* and the nut 66*d* together, which compresses the rubber washer 66*c* there between. The base connector panel 22 is then pressed against a surface of the base body 12, with the rubber washer 66*c* and nut 66*d* passing through the connector receiving passageways 14. The rubber washer 66*c* is sized to fit in the connector receiving passageways 14. When the rubber washer 66*c* is compressed tightly by the lever 66*a* in a closed position (i.e. perpendicular to the screw 66*b*), the rubber washer 66*c* extends radially outward, gripping the connector receiving passageways 14 and securing the base connector panel 22 against the base body 12 and, more particularly, the outer surface 63 of the third planar body section 62*c*.

Figure 25:
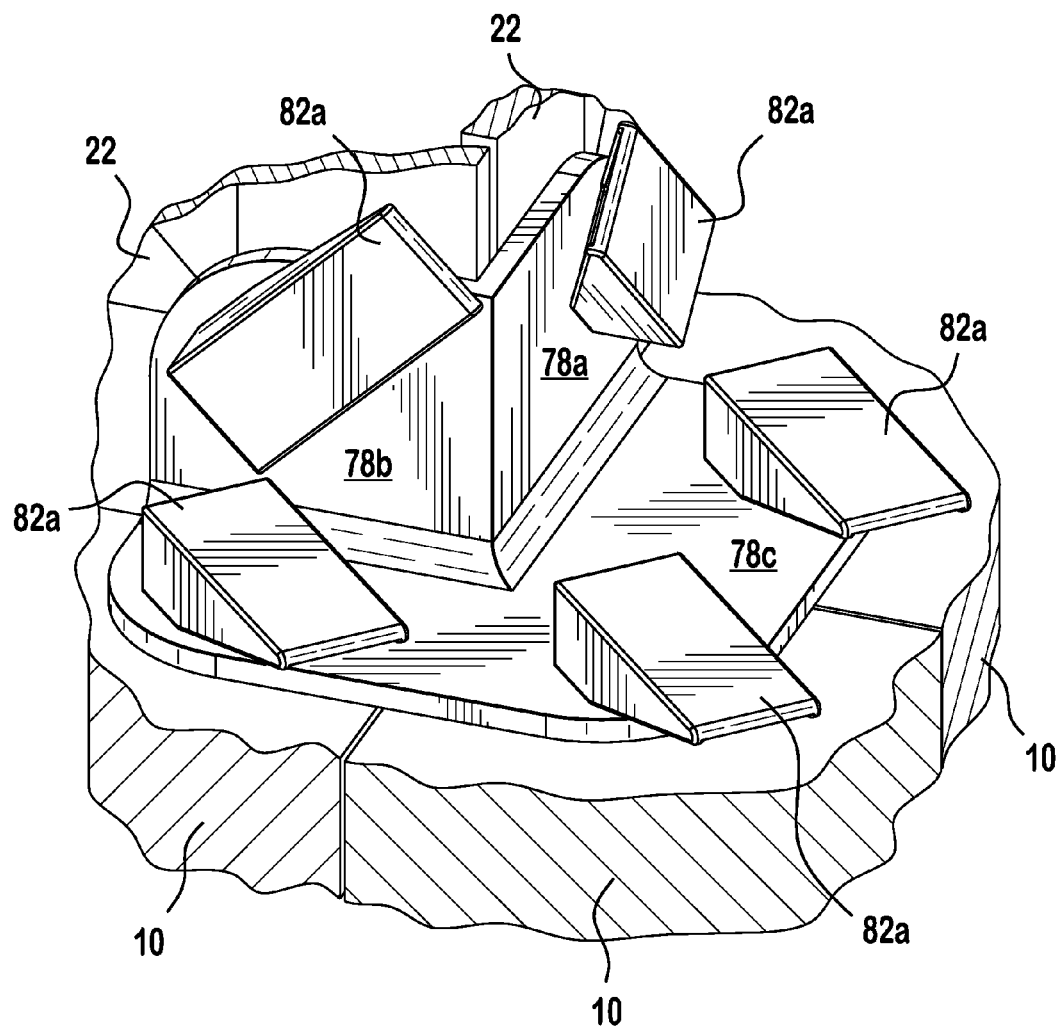
FIG. 25 is another close perspective view of a display system according to the invention, showing assembly thereof.

In another embodiment, as shown in FIG. 25, the base connector 60 can be used to secure the collapsible structure 20 to the base panels 10. The plate body 78 and, more particularly, the outer surfaces 63 of the first planar body section 62*a* and the second planar body section 62*b* are positioned flush with the panel body of each extension 22*b* of the pair of base connector panels 22, while the third planar body section 62*c* is positioned flush with the base panel 10.

As shown in FIG. 25, the screws 82*b* are positioned through of the fastener receiving passageways 80 and the rubber washer 82*c*, and engages with the nut 82*d*. The lever 82*a* is positioned opened (i.e. parallel to the screw 82*b*) and then used to tighten the screw 82*b* and the nut 82*d* together, which compresses the rubber washer 82*c* there between. Each base connector panel 22, extension 22*b*, is then pressed against a surface of the plate body 78, with the rubber washer 82*c* and nut 82*d* passing through the fastener receiving passageways 24. The rubber washer 82*c* is sized to fit in the fastener receiving passageways 24. When the rubber washer 82*c* is compressed tightly by the lever 82*a* in a closed position (i.e. perpendicular to the screw 82*b*), the rubber washer 82*c* extends radially outward, gripping the fastener receiving passageways 24 and securing the base connector panels 22 against the plate body 78 and, more particularly, the outer surfaces 63 of the first planar body section 78*a* and the second planar body section 78*b*. Likewise, the base panel 10 is then pressed against a surface of the plate body 78, the third planar body section 78*c* with the rubber washer 82*c* and nut 82*d* passing through the connector receiving passageways 14. The rubber washer 82*c* is sized to fit in the connector receiving passageways 14. When the rubber washer 82*c* is compressed tightly by the lever 82*a* in a closed position (i.e. perpendicular to the screw 82*b*), the rubber washer 82*c* extends radially outward, gripping the connector receiving passageways 14 and securing the base panel 10 against the plate body 78 and, more particularly, the outer surface 63 of the third planar body section 78*c*.

In order to facilitate assembly, the displays system 1 according to the invention is assembled from the ground up. For instance, the base panels 10 are aligned and positioned on a support surface, such as a floor. Next, the base connector panels 22 are positioned in an arrangement (i.e. two rows of base connector panels 22) and secured to the base panels 10. At the same time, the base connector panels 22 are secured to one another. Next, the modular display panels 30 are assembled in arrangement and then secured to the base connector panels 22. Then the modular display panels 30 are secured to one another.

The foregoing illustrates some of the possibilities for practicing the invention. Many other embodiments are possible within the scope and spirit of the invention. The disclosed invention utilizes the above identified components, as a system, in order to more efficiently construct a display system 1 for a particular purpose. Therefore, more or less of the aforementioned components can be used to conform to that particular purpose. It is, therefore, intended that the foregoing description be regarded as illustrative rather than limiting, and that the scope of the invention is given by the appended claims together with their full range of equivalents.

What is claimed is:

1. A display system, comprising:
   a base panel;
   a collapsible structure having a pair of modular display panels receiving one another through a pair of panel connectors extending there through;
   a structure connector having a pair of planar body sections angled with respect to each other and connecting to the pair of modular display panels; and
   a base connector connecting the collapsible structure to the base panel and having:
   a first planar body section secured to the collapsible structure;
   a second planar body section positioned adjacent to the first planar body section and secured to the collapsible structure; and
   a third planar body section positioned adjacent to the first planar body section and the second planar body section and secured to the base panel.

2. The display system of claim 1, wherein the third planar body section is positioned substantially orthogonal to the first planar body section and the second planar body section.

3. The display system of claim 1, wherein the base panel includes a base body and connector receiving passageway extending there through.

4. The display system of claim 3, wherein the base connector engages the connector receiving passageway.

5. The display system of claim 4, wherein the base connector includes a plurality of fasteners having a swell latch with a rubber washer sized to frictionally fit with the connector receiving passageway.

6. The display system of claim 4, wherein the collapsible structure further includes a base connector panel secured to the base panel using the base connector.

7. The display system of claim 6, wherein the base connector panel includes a fastener receiving passageway receiving the base connector.

8. The display system of claim 7, wherein the base connector panel includes a panel body and a pair of extensions extending outward from the panel body at an angle.

9. The display system of claim 8, wherein the pair of extensions is angled with respect to an arrangement of the pair of the modular display panels.

10. The display system of claim 2, wherein each panel connector of the pair of panel connectors extends transversely across a panel body of one of the pair of modular display panels.

11. The display system of claim 10, wherein each panel connector is a slot that extends through the panel body.

12. The display system of claim 11, wherein the slot extends from an edge of the panel body to a substantial center section thereof.

13. The display system of claim 12, wherein the slot from one modular display panel of the pair of modular display panels receives the slot from the other of the pair of modular display panels.

14. The display system of claim 13, wherein the pair of modular display panels overlap each other to form an x-shaped arrangement.

15. The display system of claim 1, wherein the third planar body section is L-shaped.

16. A display system, comprising:
a base panel having a base body and connector receiving passageway extending there through;
a collapsible structure having a pair of modular display panels with a pair of panel connectors receiving one another; and
a structure connector having a pair of planar body sections angled with respect to each other and connecting to the pair of modular display panels; and
a base connector engaging the connector receiving passageway and connecting the collapsible structure to the base panel and having:
 a first planar body section secured to the collapsible structure;
 a second planar body section positioned adjacent to the first planar body section and secured to the collapsible structure;
 a third planar body section positioned adjacent and orthogonal to the first planar body section and the second planar body section and secured to the base panel; and
 a plurality of fasteners having a swell latch with a rubber washer sized to frictionally fit with the connector receiving passageway.

* * * * *